(12) United States Patent
Liu et al.

(10) Patent No.: US 10,531,402 B2
(45) Date of Patent: Jan. 7, 2020

(54) POWER ALLOCATION METHOD AND APPARATUS

(71) Applicant: HUAWEI TECHNOLOGIES CO., LTD., Shenzhen, Guangdong (CN)

(72) Inventors: Jianqin Liu, Beijing (CN); Bingyu Qu, Beijing (CN); Chuanfeng He, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/234,969

(22) Filed: Dec. 28, 2018

(65) Prior Publication Data

US 2019/0141642 A1    May 9, 2019

Related U.S. Application Data

(63) Continuation of application No. PCT/CN2017/090044, filed on Jun. 26, 2017.

(30) Foreign Application Priority Data

Jun. 30, 2016  (CN) .......................... 2016 1 0511895

(51) Int. Cl.
  *H04W 52/28* (2009.01)
  *H04W 56/00* (2009.01)
  (Continued)

(52) U.S. Cl.
  CPC ....... *H04W 52/281* (2013.01); *H04W 52/146* (2013.01); *H04W 52/325* (2013.01); *H04W 56/0045* (2013.01)

(58) Field of Classification Search
  CPC ............. H04W 52/281; H04W 52/146; H04W 52/325; H04W 52/34; H04W 52/346; H04W 52/367; H04W 56/0045
  (Continued)

(56) References Cited

U.S. PATENT DOCUMENTS

2014/0376471 A1  12/2014  Nishio et al.
2017/0055223 A1   2/2017  Shao et al.
(Continued)

FOREIGN PATENT DOCUMENTS

CN    103220768 A    7/2013
CN    104081838 A   10/2014
(Continued)

OTHER PUBLICATIONS

International Search Report dated Sep. 5, 2017 in corresponding International Application No. PCT/CN2017/090044.
(Continued)

*Primary Examiner* — Lee Nguyen
(74) *Attorney, Agent, or Firm* — Kilpatrick Townsend & Stockton LLP

(57) ABSTRACT

A power allocation method and apparatus belong to the field of communications technologies. The method includes: determining, by UE, a first start time point of a first control subframe and a second start time point of a second control subframe; determining, based on the first start time point and the second start time point, whether a priority of a first target subframe is higher than a priority of a second target subframe; and if the priority of the first target subframe is higher than the priority of the second target subframe, allocating, based on first uplink channel information and second uplink channel information, power to the UE in a base station or a cell group in which the first target subframe is located, and allocating reserved power of the UE to the UE in a base station or a cell group in which the second target subframe is located.

16 Claims, 10 Drawing Sheets

(51) Int. Cl.
*H04W 52/14* (2009.01)
*H04W 52/32* (2009.01)

(58) Field of Classification Search
USPC .......................................................... 455/522
See application file for complete search history.

(56) References Cited

U.S. PATENT DOCUMENTS

2017/0111891 A1    4/2017    He et al.
2017/0238263 A1    8/2017    Lee et al.

FOREIGN PATENT DOCUMENTS

| WO | 2015156521 A1 | 10/2015 |
| WO | 2015168910 A1 | 11/2015 |
| WO | 2016000241 A1 | 1/2016 |

OTHER PUBLICATIONS

R1-142263, NTT DOCOMO "Summary of email discussion" 3GPP Draft; May 2014. XP050789380. 30 pages.
R1-143124, Sharp "UL power allocation for dual Connectivity" 3GPP Draft; Aug. 2014. XP050788602. 8 pages.
R1-1706904, Huawei, HiSilicon "Power control for CA and DC", 3GPP Draft; May 2017. XP051272135. 5 pages.
Extended European Search Report dated Apr. 2, 2019 in corresponding European Patent Application No. 17819202.7 (9 pages).
International Search Report dated Sep. 5, 2017 in corresponding International Patent Application No. PCT/CN2017/090044 (7 pages).
Written Opinion of the International Searching Authority dated Sep. 5, 2017 in corresponding International Patent Application No. PCT/CN2017/090044 (4 pages).

POWER ALLOCATION METHOD AND APPARATUS

CROSS-REFERENCE TO RELATED APPLICATIONS

This application is a continuation of International Application No. PCT/CN2017/090044, filed on Jun. 26, 2017, which claims priority to Chinese Patent Application No. 201610511895.4, filed on Jun. 30, 2016, The disclosures of the aforementioned applications are hereby incorporated by reference in their entireties.

TECHNICAL FIELD

This disclosure relates to the field of communications technologies, and in particular, to a power allocation method and apparatus.

BACKGROUND

In a current communications system, user equipment (User Experience, UE) may simultaneously access a plurality of cell groups. Different cell groups may have transmission subframes of different time granularities. For ease of description, an example in which the UE simultaneously accesses a first cell group and a second cell group is used for description. The first cell group is corresponding to a first transmission subframe. The second cell group is corresponding to a second transmission subframe. The first transmission subframe and the second transmission subframe have different time granularities. When the UE transmits data to a base station, the UE adds to-be-transmitted data to the first transmission subframe and the second transmission subframe, allocates first transmit power to the first transmission subframe, and allocates second transmit power to the second transmission subframe. The UE transmits, by using the first transmit power, channel information on the first transmission subframe to the base station; and transmits, by using the second transmit power, channel information on the second transmission subframe to the base station.

A first transmission time of the first transmission subframe may overlap with a second transmission time of the second transmission subframe. In this case, the UE determines, from the first transmission subframe and the second transmission subframe based on the first transmission time and the second transmission time, a transmission subframe whose transmission time is earlier and a transmission subframe whose transmission time is later; and preferentially allocates transmit power to the transmission subframe whose transmission time is earlier. On the transmission subframe whose transmission time is later, the UE can use only reserved transmit power.

The prior art has at least the following problem:

If a time granularity of a transmission subframe whose transmission time is earlier is less than a time granularity of a transmission subframe whose transmission time is later, one transmission subframe whose transmission time is later is corresponding to a plurality of transmission subframes whose transmission times are earlier. When there is not always to-be-transmitted data on the plurality of transmission subframes whose transmission times are earlier, idle transmit power on the transmission subframes whose transmission times are earlier cannot be re-allocated to the transmission subframe whose transmission time is later, thereby causing waste of power resources and low power utilization.

SUMMARY

To resolve the prior-art problem, this disclosure provides a power allocation method and apparatus. Technical solutions are as follows:

According to a first aspect, an embodiment of this disclosure provides a power allocation method. The method includes:

determining, by user equipment UE, a first start time point of a first control subframe and a second start time point of a second control subframe, where the first control subframe is used to transmit control information of a first target subframe, the second control subframe is used to transmit control information of a second target subframe, a transmission time of the second target subframe overlaps with a transmission time of the first target subframe, the second target subframe and the first target subframe have different subframe lengths, and the second target subframe and the first target subframe belong to different base stations or different cell groups;

determining, by the UE based on the first start time point and the second start time point, whether a priority of the first target subframe is higher than a priority of the second target subframe, and determining first uplink channel information on the first target subframe and second uplink channel information on the second target subframe; and if the priority of the first target subframe is higher than the priority of the second target subframe, allocating, by the UE based on the first uplink channel information and the second uplink channel information, power to the UE in a base station or a cell group in which the first target subframe is located, and allocating reserved power of the UE to the UE in a base station or a cell group in which the second target subframe is located; or if the priority of the first target subframe is lower than the priority of the second target subframe, allocating, by the UE based on the first uplink channel information and the second uplink channel information, power to the UE in a base station or a cell group in which the second target subframe is located, and allocating reserved power of the UE to the UE in a base station or a cell group in which the first target subframe is located.

In this embodiment of this disclosure, it is determined, based on the first start time point of the first control subframe and the second start time point of the second control subframe, whether the priority of the first target subframe is higher than the priority of the second target subframe. Because a start time point of a control subframe of a target subframe that has a lower frequency may be earlier than a start time point of a control subframe of a target subframe that has a higher frequency, it can be determined that a priority of the target subframe that has a lower frequency is higher than a priority of the target subframe that has a higher frequency, and power is preferentially allocated to the UE in a base station or a cell group in which the target subframe that has a lower frequency is located. This avoids a problem that possibly idle transmit power on a target subframe whose transmission time is earlier cannot be re-allocated to a target subframe whose transmission time is later, and improves power utilization.

In a possible design, the determining, by the UE based on the first start time point and the second start time point, whether a priority of the first target subframe is higher than a priority of the second target subframe includes:

if the first start time point is earlier than the second start time point, determining, by the UE, that the priority of the first target subframe is higher than the priority of the second target subframe; or if the second start time point is earlier than the first start time point, determining, by the UE, that the priority of the first target subframe is lower than the priority of the second target subframe.

In this embodiment of this disclosure, it is determined that a priority of a target subframe of a control subframe whose start time point is earlier is higher than a priority of a target subframe of a control subframe whose start time point is later. Therefore, it can be determined that a priority of a target subframe that has a lower frequency is higher than a priority of a target subframe that has a higher frequency. This avoids a problem that possibly idle transmit power on a target subframe whose transmission time is earlier cannot be re-allocated to a target subframe whose transmission time is later, and improves power utilization.

In another possible design, the determining, by the UE based on the first start time point and the second start time point, whether a priority of the first target subframe is higher than a priority of the second target subframe includes:

calculating, by the UE, a time difference between the first start time point and the second start time point; and determining, by the UE based on the time difference and a time difference threshold, whether the priority of the first target subframe is higher than the priority of the second target subframe.

In this embodiment of this disclosure, the time difference threshold is set, and it is determined, based on the time difference between the first start time point and the second start time point and the time difference threshold, whether the priority of the first target subframe is higher than the priority of the second target subframe, so that a power allocation priority of the UE can be flexibly configured in different scenarios, and power utilization is maximally improved.

In another possible design, the determining, by the UE based on the time difference and a time difference threshold, whether the priority of the first target subframe is higher than the priority of the second target subframe includes:

if the time difference is greater than the time difference threshold, determining, by the UE, that the priority of the first target subframe is higher than the priority of the second target subframe; or if the time difference is not greater than the time difference threshold, determining, by the UE, that the priority of the first target subframe is lower than the priority of the second target subframe.

In another possible design, the determining, by UE, a first start time point of a first control subframe and a second start time point of a second control subframe includes:

obtaining, by the UE, a first time offset of the first control subframe and a second time offset of the second control subframe; and determining, by the UE, the first start time point of the first control subframe and the second start time point of the second control subframe based on the first time offset and the second time offset.

In this embodiment of this disclosure, the first start time point of the first control subframe and the second start time point of the second control subframe are determined based on the first time offset and the second time offset, so that a power allocation priority of the UE can be flexibly configured in different scenarios, and power utilization is maximally improved.

In another possible design, the allocating, by the UE based on the first uplink channel information and the second uplink channel information, power to the UE in a base station or a cell group in which the first target subframe is located includes:

when an uplink channel of the first target subframe includes a random access channel PRACH, calculating, by the UE, first guaranteed power of the uplink channel of the first target subframe based on the first uplink channel information and the second uplink channel information, where the first guaranteed power is power configured, by using higher layer signaling, for the UE in the base station or the cell group in which the first target subframe is located; and allocating, by the UE based on the first guaranteed power and first required power of the uplink channel of the first target subframe, the power to the UE in the base station or the cell group in which the first target subframe is located.

In this embodiment of this disclosure, if the priority of the first target subframe is higher than the priority of the second target subframe, the power is allocated, based on the first guaranteed power and the first required power, to the UE in the base station or the cell group in which the first target subframe is located, so that a power requirement of allocating the power to the UE in the base station or the cell group in which the first target subframe is located can be met.

In another possible design, the calculating, by the UE, first guaranteed power of the uplink channel of the first target subframe based on the first uplink channel information and the second uplink channel information includes:

calculating, by the UE, the first guaranteed power of the uplink channel of the first target subframe based on a reserved power factor of uplink data transmission in the base station or the cell group in which the second target subframe is located, transmit power of a data channel and a PRACH of the second target subframe, transmit power of the PRACH of the first target subframe, and maximum transmit power at a time point at which the transmission time of the first target subframe overlaps with the transmission time of the second target subframe.

In this embodiment of this disclosure, if the priority of the first target subframe is higher than the priority of the second target subframe, the first guaranteed power of the uplink channel of the first target subframe is calculated based on the first uplink channel information and the second uplink channel information, so that a power requirement of allocating the power to the UE in the base station or the cell group in which the first target subframe is located can be met.

In another possible design, the reserved power allocated to the UE in the base station or the cell group in which the second target subframe is located is less than or equal to the first guaranteed power, and is less than or equal to a difference between maximum transmit power of the UE and the power allocated to the UE in the base station or the cell group in which the first target subframe is located.

In this embodiment of this disclosure, if the priority of the first target subframe is higher than the priority of the second target subframe, the reserved power allocated to the UE in the base station or the cell group in which the second target subframe is located can meet a power requirement of the UE.

In another possible design, the allocating, by the UE based on the first uplink channel information and the second uplink channel information, power to the UE in a base station or a cell group in which the second target subframe is located includes:

when an uplink channel of the second target subframe includes a random access channel PRACH, calculating, by the UE, second guaranteed power of the uplink channel of the second target subframe based on the first uplink channel information and the second uplink channel information, where the second guaranteed power is power configured, by using higher layer signaling, for the UE in the base station or the cell group in which the second target subframe is located; and allocating, by the UE based on the second guaranteed power and second required power of the uplink channel of the second target subframe, the power to the UE in the base station or the cell group in which the second target subframe is located.

In this embodiment of this disclosure, if the priority of the second target subframe is higher than the priority of the first target subframe, the power is allocated, based on the second guaranteed power and the second required power, to the UE in the base station or the cell group in which the second target subframe is located, so that a power requirement of allocating the power to the UE in the base station or the cell group in which the second target subframe is located can be met.

In another possible design, the calculating, by the UE, second guaranteed power of the uplink channel of the second target subframe based on the first uplink channel information and the second uplink channel information includes:

calculating, by the UE, the guaranteed power of the uplink channel of the second target subframe based on a reserved power factor of uplink data transmission in the base station or the cell group in which the first target subframe is located, transmit power of a data channel and a PRACH of the first target subframe, transmit power of the PRACH of the second target subframe, and maximum transmit power at a time point at which the transmission time of the first target subframe overlaps with the transmission time of the second target subframe.

In this embodiment of this disclosure, if the priority of the second target subframe is higher than the priority of the first target subframe, the second guaranteed power of the uplink channel of the second target subframe is calculated based on the first uplink channel information and the second uplink channel information, so that a power requirement of allocating the power to the UE in the base station or the cell group in which the second target subframe is located can be met.

In another possible design, the reserved power allocated to the UE in the base station or the cell group in which the first target subframe is located is less than or equal to the second guaranteed power, and is less than or equal to a difference between maximum transmit power of the UE and the power allocated to the UE in the base station or the cell group in which the second target subframe is located.

In this embodiment of this disclosure, if the priority of the second target subframe is higher than the priority of the first target subframe, the reserved power allocated to the UE in the base station or the cell group in which the first target subframe is located can meet a power requirement of the UE.

According to a second aspect, an embodiment of this disclosure provides a power allocation method. The method includes:

obtaining, by a base station, first uplink channel information on a first target subframe and second uplink channel information on a second target subframe, where a transmission time of the second target subframe overlaps with a transmission time of the first target subframe, the second target subframe and the first target subframe have different subframe lengths, and the second target subframe and the first target subframe belong to different base stations or different cell groups;

determining, by the base station, a first time offset of a first control subframe and a second time offset of a second control subframe based on the first uplink channel information and the second uplink channel information, where the first control subframe is used to transmit control information of the first target subframe, and the second control subframe is used to transmit control information of the second target subframe; and sending, by the base station, the first time offset and the second time offset to user equipment UE, where the UE determines a first start time point of the first control subframe and a second start time point of the second control subframe based on the first time offset and the second time offset, allocates, based on the first start time point and the second start time point, power to the UE in a base station or a cell group in which the first target subframe is located, and allocates power to the UE in a base station or a cell group in which the second target subframe is located.

In this embodiment of this disclosure, the base station configures the first time offset and the second time offset for the UE, and the UE determines the first start time point of the first control subframe and the second start time point of the second control subframe based on the first time offset and the second time offset, so that a power allocation priority of the UE can be flexibly configured in different scenarios, and power utilization is maximally improved.

In a possible design, the determining, by the base station, a first time offset of a first control subframe and a second time offset of a second control subframe based on the first uplink channel information and the second uplink channel information includes:

determining, by the base station based on the first uplink channel information and the second uplink channel information, whether a priority of the first target subframe is higher than a priority of the second target subframe; and if the priority of the first target subframe is higher than the priority of the second target subframe, determining, by the base station, the first time offset of the first control subframe and the second time offset of the second control subframe, where the first time offset and the second time offset meet a first preset condition, and the first preset condition is that the first start time point of the first control subframe is earlier than the second start time point of the second control subframe, or a time difference between the first start time point of the first control subframe and the second start time point of the second control subframe is greater than a time difference threshold; or if the priority of the first target subframe is lower than the priority of the second target subframe, determining, by the base station, the first time offset of the first control subframe and the second time offset of the second control subframe, where the first time offset and the second time offset meet a second preset condition, and the second preset condition is that the second start time point of the second control subframe is earlier than the first start time point of the first control subframe, or a time difference between the first start time point of the first control subframe and the second start time point of the second control subframe is not greater than a time difference threshold.

In this embodiment of this disclosure, the base station may configure, by configuring the first time offset and the second time offset, whether the priority of the first target subframe determined by the UE is higher than the priority of the second target subframe, so that a power allocation priority of the UE can be flexibly configured in different scenarios, and power utilization is maximally improved.

According to a third aspect, an embodiment of this disclosure provides a power allocation apparatus. The apparatus includes:

a first determining module, configured to determine a first start time point of a first control subframe and a second start time point of a second control subframe, where the first control subframe is used to transmit control information of a first target subframe, the second control subframe is used to transmit control information of a second target subframe, a transmission time of the second target subframe overlaps with a transmission time of the first target subframe, the second target subframe and the first target subframe have different subframe lengths, and the second target subframe and the first target subframe belong to different base stations or different cell groups;

a second determining module, configured to: determine, based on the first start time point and the second start time point, whether a priority of the first target subframe is higher than a priority of the second target subframe, and determine first uplink channel information on the first target subframe and second uplink channel information on the second target subframe;

a first allocation module, configured to: if the priority of the first target subframe is higher than the priority of the second target subframe, allocate, based on the first uplink channel information and the second uplink channel information, power to the UE in a base station or a cell group in which the first target subframe is located, and allocate reserved power of the UE to the UE in a base station or a cell group in which the second target subframe is located; and a second allocation module, configured to: if the priority of the first target subframe is lower than the priority of the second target subframe, allocate, based on the first uplink channel information and the second uplink channel information, power to the UE in a base station or a cell group in which the second target subframe is located, and allocate reserved power of the UE to the UE in a base station or a cell group in which the first target subframe is located.

In a possible design, the second determining module is further configured to: if the first start time point is earlier than the second start time point, determine that the priority of the first target subframe is higher than the priority of the second target subframe; or the second determining module is further configured to: if the second start time point is earlier than the first start time point, determine that the priority of the first target subframe is lower than the priority of the second target subframe.

In another possible design, the second determining module is further configured to: calculate a time difference between the first start time point and the second start time point, and determine, based on the time difference and a time difference threshold, whether the priority of the first target subframe is higher than the priority of the second target subframe.

In another possible design, the second determining module is further configured to: if the time difference is greater than the time difference threshold, determine that the priority of the first target subframe is higher than the priority of the second target subframe; or the second determining module is further configured to: if the time difference is not greater than the time difference threshold, determine that the priority of the first target subframe is lower than the priority of the second target subframe.

In another possible design, the first determining module is further configured to: obtain a first time offset of the first control subframe and a second time offset of the second control subframe, and determine the first start time point of the first control subframe and the second start time point of the second control subframe based on the first time offset and the second time offset.

In another possible design, the first allocation module is further configured to: when an uplink channel of the first target subframe includes a random access channel PRACH, calculate first guaranteed power of the uplink channel of the first target subframe based on the first uplink channel information and the second uplink channel information, where the first guaranteed power is power configured, by using higher layer signaling, for the UE in the base station or the cell group in which the first target subframe is located; and allocate, based on the first guaranteed power and first required power of the uplink channel of the first target subframe, the power to the UE in the base station or the cell group in which the first target subframe is located.

In another possible design, the first allocation module is further configured to calculate the first guaranteed power of the uplink channel of the first target subframe based on a reserved power factor of uplink data transmission in the base station or the cell group in which the second target subframe is located, transmit power of a data channel and a PRACH of the second target subframe, transmit power of the PRACH of the first target subframe, and maximum transmit power at a time point at which the transmission time of the first target subframe overlaps with the transmission time of the second target subframe.

In another possible design, the reserved power allocated to the UE in the base station or the cell group in which the second target subframe is located is less than or equal to the first guaranteed power, and is less than or equal to a difference between maximum transmit power of the UE and the power allocated to the UE in the base station or the cell group in which the first target subframe is located.

In another possible design, the second allocation module is further configured to: when an uplink channel of the second target subframe includes a random access channel PRACH, calculate, by the UE, second guaranteed power of the uplink channel of the second target subframe based on the first uplink channel information and the second uplink channel information, where the second guaranteed power is power configured, by using higher layer signaling, for the UE in the base station or the cell group in which the second target subframe is located; and allocate, based on the second guaranteed power and second required power of the uplink channel of the second target subframe, the power to the UE in the base station or the cell group in which the second target subframe is located.

In another possible design, the second allocation module is further configured to calculate the guaranteed power of the uplink channel of the second target subframe based on a reserved power factor of uplink data transmission in the base station or the cell group in which the first target subframe is located, transmit power of a data channel and a PRACH of the first target subframe, transmit power of the PRACH of the second target subframe, and maximum transmit power at a time point at which the transmission time of the first target subframe overlaps with the transmission time of the second target subframe.

In another possible design, the reserved power allocated to the UE in the base station or the cell group in which the first target subframe is located is less than or equal to the second guaranteed power, and is less than or equal to a difference between maximum transmit power of the UE and the power allocated to the UE in the base station or the cell group in which the second target subframe is located.

According to a fourth aspect, an embodiment of this disclosure provides a power allocation apparatus. The apparatus includes:

an obtaining module, configured to obtain first uplink channel information on a first target subframe and second uplink channel information on a second target subframe, where a transmission time of the second target subframe overlaps with a transmission time of the first target subframe, the second target subframe and the first target subframe have different subframe lengths, and the second target subframe and the first target subframe belong to different base stations or different cell groups;

a third determining module, configured to determine a first time offset of a first control subframe and a second time offset of a second control subframe based on the first uplink channel information and the second uplink channel information, where the first control subframe is used to transmit control information of the first target subframe, and the second control subframe is used to transmit control information of the second target subframe; and a sending module, configured to send the first time offset and the second time offset to user equipment UE, where the UE determines a first start time point of the first control subframe and a second start time point of the second control subframe based on the first time offset and the second time offset, allocates, based on the first start time point and the second start time point, power to the UE in a base station or a cell group in which the first target subframe is located, and allocates power to the UE in a base station or a cell group in which the second target subframe is located.

In a possible design, the third determining module is further configured to determine, based on the first uplink channel information and the second uplink channel information, whether a priority of the first target subframe is higher than a priority of the second target subframe; and the third determining module is further configured to: if the priority of the first target subframe is higher than the priority of the second target subframe, determine the first time offset of the first control subframe and the second time offset of the second control subframe, where the first time offset and the second time offset meet a first preset condition, and the first preset condition is that the first start time point of the first control subframe is earlier than the second start time point of the second control subframe, or a time difference between the first start time point of the first control subframe and the second start time point of the second control subframe is greater than a time difference threshold; or the third determining module is further configured to: if the priority of the first target subframe is lower than the priority of the second target subframe, determine the first time offset of the first control subframe and the second time offset of the second control subframe, where the first time offset and the second time offset meet a second preset condition, and the second preset condition is that the second start time point of the second control subframe is earlier than the first start time point of the first control subframe, or a time difference between the first start time point of the first control subframe and the second start time point of the second control subframe is not greater than a time difference threshold.

According to a fifth aspect, an embodiment of this disclosure provides power allocation user equipment. The user equipment includes:

a first processor, configured to determine a first start time point of a first control subframe and a second start time point of a second control subframe, where the first control subframe is used to transmit control information of a first target subframe, the second control subframe is used to transmit control information of a second target subframe, a transmission time of the second target subframe overlaps with a transmission time of the first target subframe, the second target subframe and the first target subframe have different subframe lengths, and the second target subframe and the first target subframe belong to different base stations or different cell groups, where the first processor is further configured to: determine, based on the first start time point and the second start time point, whether a priority of the first target subframe is higher than a priority of the second target subframe, and determine first uplink channel information on the first target subframe and second uplink channel information on the second target subframe; and a first transmitter, configured to: if the priority of the first target subframe is higher than the priority of the second target subframe, allocate, based on the first uplink channel information and the second uplink channel information, power to the UE in a base station or a cell group in which the first target subframe is located, and allocate reserved power of the UE to the UE in a base station or a cell group in which the second target subframe is located, where the first transmitter is further configured to: if the priority of the first target subframe is lower than the priority of the second target subframe, allocate, based on the first uplink channel information and the second uplink channel information, power to the UE in a base station or a cell group in which the second target subframe is located, and allocate reserved power of the UE to the UE in a base station or a cell group in which the first target subframe is located.

In a possible design, the first processor is further configured to: if the first start time point is earlier than the second start time point, determine that the priority of the first target subframe is higher than the priority of the second target subframe; or the first processor is further configured to: if the second start time point is earlier than the first start time point, determine that the priority of the first target subframe is lower than the priority of the second target subframe.

In another possible design, the first processor is further configured to: calculate a time difference between the first start time point and the second start time point, and determine, based on the time difference and a time difference threshold, whether the priority of the first target subframe is higher than the priority of the second target subframe.

In another possible design, the first processor is further configured to: if the time difference is greater than the time difference threshold, determine that the priority of the first target subframe is higher than the priority of the second target subframe; or the first processor is further configured to: if the time difference is not greater than the time difference threshold, determine that the priority of the first target subframe is lower than the priority of the second target subframe.

In another possible design, the first processor is further configured to: obtain a first time offset of the first control subframe and a second time offset of the second control subframe, and determine the first start time point of the first control subframe and the second start time point of the second control subframe based on the first time offset and the second time offset.

In another possible design, the first transmitter is further configured to: when an uplink channel of the first target subframe includes a random access channel PRACH, calculate first guaranteed power of the uplink channel of the first target subframe based on the first uplink channel information and the second uplink channel information, where the first guaranteed power is power configured, by using higher layer signaling, for the UE in the base station or the cell group in which the first target subframe is located; and allocate, based on the first guaranteed power and first required power of the uplink channel of the first target subframe, the power to the UE in the base station or the cell group in which the first target subframe is located.

In another possible design, the first transmitter is further configured to calculate the first guaranteed power of the uplink channel of the first target subframe based on a reserved power factor of uplink data transmission in the base station or the cell group in which the second target subframe is located, transmit power of a data channel and a PRACH of the second target subframe, transmit power of the PRACH of the first target subframe, and maximum transmit power at a time point at which the transmission time of the first target subframe overlaps with the transmission time of the second target subframe.

In another possible design, the reserved power allocated to the UE in the base station or the cell group in which the second target subframe is located is less than or equal to the first guaranteed power, and is less than or equal to a difference between maximum transmit power of the UE and the power allocated to the UE in the base station or the cell group in which the first target subframe is located.

In another possible design, the first transmitter is further configured to: when an uplink channel of the second target subframe includes a random access channel PRACH, calculate, by the UE, second guaranteed power of the uplink channel of the second target subframe based on the first uplink channel information and the second uplink channel information, where the second guaranteed power is power configured, by using higher layer signaling, for the UE in the base station or the cell group in which the second target subframe is located; and allocate, based on the second guaranteed power and second required power of the uplink channel of the second target subframe, the power to the UE in the base station or the cell group in which the second target subframe is located.

In another possible design, the first transmitter is further configured to calculate the guaranteed power of the uplink channel of the second target subframe based on a reserved power factor of uplink data transmission in the base station or the cell group in which the first target subframe is located, transmit power of a data channel and a PRACH of the first target subframe, transmit power of the PRACH of the second target subframe, and maximum transmit power at a time point at which the transmission time of the first target subframe overlaps with the transmission time of the second target subframe.

In another possible design, the reserved power allocated to the UE in the base station or the cell group in which the first target subframe is located is less than or equal to the second guaranteed power, and is less than or equal to a difference between maximum transmit power of the UE and the power allocated to the UE in the base station or the cell group in which the second target subframe is located.

According to a sixth aspect, an embodiment of this disclosure provides a power allocation base station. The base station includes:

a second processor, configured to obtain first uplink channel information on a first target subframe and second uplink channel information on a second target subframe, where a transmission time of the second target subframe overlaps with a transmission time of the first target subframe, the second target subframe and the first target subframe have different subframe lengths, and the second target subframe and the first target subframe belong to different base stations or different cell groups, where the second processor is further configured to determine a first time offset of a first control subframe and a second time offset of a second control subframe based on the first uplink channel information and the second uplink channel information, where the first control subframe is used to transmit control information of the first target subframe, and the second control subframe is used to transmit control information of the second target subframe; and a second transmitter, configured to send the first time offset and the second time offset to user equipment UE, where the UE determines a first start time point of the first control subframe and a second start time point of the second control subframe based on the first time offset and the second time offset, allocates, based on the first start time point and the second start time point, power to the UE in a base station or a cell group in which the first target subframe is located, and allocates power to the UE in a base station or a cell group in which the second target subframe is located.

In a possible design, the second processor is further configured to determine, based on the first uplink channel information and the second uplink channel information, whether a priority of the first target subframe is higher than a priority of the second target subframe; and the second processor is further configured to: if the priority of the first target subframe is higher than the priority of the second target subframe, determine the first time offset of the first control subframe and the second time offset of the second control subframe, where the first time offset and the second time offset meet a first preset condition, and the first preset condition is that the first start time point of the first control subframe is earlier than the second start time point of the second control subframe, or a time difference between the first start time point of the first control subframe and the second start time point of the second control subframe is greater than a time difference threshold; or the second processor is further configured to: if the priority of the first target subframe is lower than the priority of the second target subframe, determine the first time offset of the first control subframe and the second time offset of the second control subframe, where the first time offset and the second time offset meet a second preset condition, and the second preset condition is that the second start time point of the second control subframe is earlier than the first start time point of the first control subframe, or a time difference between the first start time point of the first control subframe and the second start time point of the second control subframe is not greater than a time difference threshold.

According to a seventh aspect, an embodiment of this disclosure provides a computer storage medium. The computer storage medium stores a computer program, and the computer program implements the method in the first aspect or any possible implementation of the first aspect when executed by a processor.

According to an eighth aspect, an embodiment of this disclosure provides a computer storage medium. The computer storage medium stores a computer program, and the computer program implements the method in the second aspect or any possible implementation of the second aspect when executed by a processor.

According to a ninth aspect, a computer program product including an instruction is provided. When the computer program product runs on a computer, the computer is enabled to perform the method in the first aspect or any possible implementation of the first aspect.

According to a tenth aspect, a computer program product including an instruction is provided. When the computer program product runs on a computer, the computer is enabled to perform the method in the second aspect or any possible implementation of the second aspect.

In the embodiments of this disclosure, it is determined, based on the first start time point of the first control subframe and the second start time point of the second control subframe, whether the priority of the first target subframe is higher than the priority of the second target subframe. Because a start time point of a control subframe of a target subframe that has a lower frequency may be earlier than a start time point of a control subframe of a target subframe that has a higher frequency, it can be determined that a priority of the target subframe that has a lower frequency is higher than a priority of the target subframe that has a higher frequency, and power is preferentially allocated to the UE in a base station or a cell group in which the target subframe that has a lower frequency is located. This avoids a problem that possibly idle transmit power on a target subframe whose transmission time is earlier cannot be re-allocated to a target subframe whose transmission time is later, and improves power utilization.

BRIEF DESCRIPTION OF DRAWINGS

FIG. 1-2 is a schematic diagram of a first target subframe and a second target subframe according to an embodiment of this disclosure;

FIG. 1-3 is a schematic diagram of a relationship between a target subframe and a control subframe according to an embodiment of this disclosure;

FIG. 1-4 is a schematic structural diagram of user equipment according to an embodiment of this disclosure;

FIG. 2 is a schematic structural diagram of a base station according to an embodiment of this disclosure;

FIG. 3-1 is a flowchart of a power allocation method according to an embodiment of this disclosure;

FIG. 3-2 is a schematic diagram of a relationship between a target subframe and a control subframe according to an embodiment of this disclosure;

FIG. 4-1 is a flowchart of a power allocation method according to an embodiment of this disclosure;

FIG. 4-2 is a schematic diagram of a start time point of a control subframe according to an embodiment of this disclosure;

DESCRIPTION OF EMBODIMENTS

To make the objectives, technical solutions, and advantages of this disclosure clearer, the following further describes the implementations of this disclosure in detail with reference to the accompanying drawings.

Figure 1:
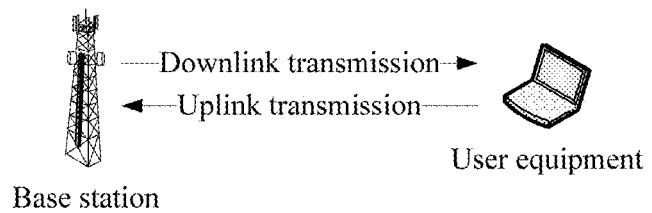
FIG. 1-1 is a schematic diagram of a communications system according to an embodiment of this disclosure.

In a current communications system, such as a Long Term Evolution (Long Term Evolution, LTE) communications system or a Wideband Code Division Multiple Access (Wideband Code Division Multiple Access, WCDMA) communications system, the communications system includes a base station and UE, as shown in FIG. 1-1. The UE simultaneously performs uplink data transmission on a first target subframe and a second target subframe that have different subframe lengths. A frequency of the first target subframe is different from a frequency of the second target subframe.

Figures 1, 2:
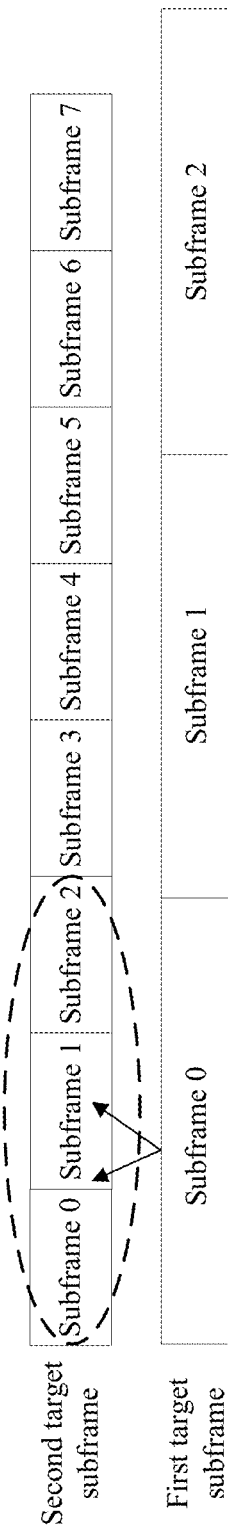
Figures 1, 2, 3:
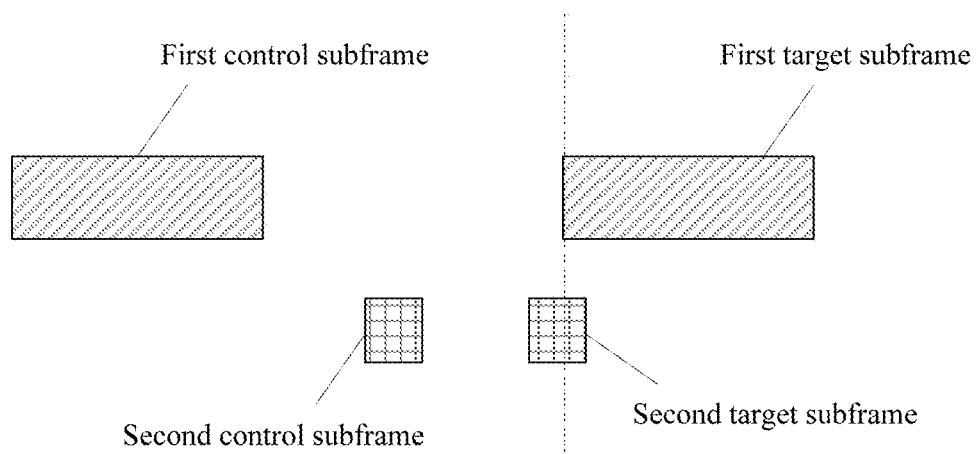

For example, referring to FIG. 1-2, a subframe length of the first target subframe is greater than a subframe length of the second target subframe, the frequency of the first target subframe is lower than the frequency of the second target subframe, and one first target subframe is corresponding to a plurality of second target subframes. Therefore, there may be a case in which uplink control information of the UE on the first target subframe arrives first, although uplink data of the UE transmitted on the first target subframe is transmitted after uplink data of the UE transmitted on the second target subframe (control information is usually transmitted in the first four subframes of a target subframe). As shown in FIG. 1-3, a first control subframe is used to transmit control information of the first target subframe, and a second control subframe is used to transmit control information of the second target subframe. A first start time point of the first control subframe is earlier than a second start time point. The UE determines that a priority of the first target subframe is higher than a priority of the second target subframe. The UE preferentially allocates power to the UE in a base station or a cell group in which the first target subframe is located, and allocates reserved power of the UE in a base station or a cell group in which the second target subframe is located, so that power is preferentially allocated to a low-frequency subframe. This avoids a case in which transmit power on a high-frequency subframe on which no data transmission is performed cannot be re-allocated for data transmission on a low-frequency subframe because there is not always data transmission on the high-frequency subframe.

Referring to FIG. 1-4, FIG. 1-4 is a structural block diagram of UE according to an embodiment of this disclosure. The UE may vary greatly due to different configurations or performance, and may include one or more first processors 101 and a first transmitter 102.

The first processor 101 is configured to determine a first start time point of a first control subframe and a second start time point of a second control subframe. The first control subframe is used to transmit control information of a first target subframe. The second control subframe is used to transmit control information of a second target subframe. A transmission time of the second target subframe overlaps with a transmission time of the first target subframe. The second target subframe and the first target subframe have different subframe lengths. The second target subframe and the first target subframe belong to different base stations or different cell groups.

The first processor 101 further determines, based on the first start time point and the second start time point, whether a priority of the first target subframe is higher than a priority of the second target subframe, and determines first uplink channel information on the first target subframe and second uplink channel information on the second target subframe.

The first transmitter 102 is configured to: if the priority of the first target subframe is higher than the priority of the second target subframe, allocate, based on the first uplink channel information and the second uplink channel information, power to the UE in a base station or a cell group in which the first target subframe is located, and allocate reserved power of the UE to the UE in a base station or a cell group in which the second target subframe is located.

The first transmitter 102 is further configured to: if the priority of the first target subframe is lower than the priority of the second target subframe, allocate, based on the first uplink channel information and the second uplink channel information, power to the UE in a base station or a cell group in which the second target subframe is located, and allocate reserved power of the UE to the UE in a base station or a cell group in which the first target subframe is located.

Optionally, in addition to the first processor 101 and the first transmitter 102, the UE may further include other components. For example, the UE may further include a first memory 103, and one or more first storage media 106 (for example, one or more mass storage devices) that store a first application program 104 or first data 105. The first memory 103 and the first storage medium 106 may be transient storages or persistent storages. A program stored in the first storage medium 106 may include one or more modules (not shown in the figure), and each module may include a series of instruction operations in a power allocation apparatus. Further, the first processor 101 may be configured to communicate with the first storage medium 106, and perform, on the UE, a series of instruction operations in the first storage medium 106.

The UE may further include one or more first power supplies 107, one or more first wired or wireless network interfaces 108, one or more first input/output interfaces 109, one or more first keyboards 110, and/or one or more first operating systems 111, such as Windows Server™, Mac OS X™, Unix™, Linux™, and FreeBSD™.

In this disclosure, the first processor 101 and the first transmitter 102 that are included in the UE may further have the following functions:

The first processor 101 is further configured to: if the first start time point is earlier than the second start time point, determine that the priority of the first target subframe is higher than the priority of the second target subframe; or the first processor 101 is further configured to: if the second start time point is earlier than the first start time point, determine that the priority of the first target subframe is lower than the priority of the second target subframe.

Optionally, the first processor 101 is further configured to: calculate a time difference between the first start time point and the second start time point, and determine, based on the time difference and a time difference threshold, whether the priority of the first target subframe is higher than the priority of the second target subframe.

Optionally, the first processor 101 is further configured to: if the time difference is greater than the time difference threshold, determine that the priority of the first target subframe is higher than the priority of the second target subframe; or the first processor 101 is further configured to: if the time difference is not greater than the time difference threshold, determine that the priority of the first target subframe is lower than the priority of the second target subframe.

Optionally, the first processor 101 is further configured to: obtain a first time offset of the first control subframe and a second time offset of the second control subframe, and determine the first start time point of the first control subframe and the second start time point of the second control subframe based on the first time offset and the second time offset.

Optionally, the first transmitter 102 is further configured to: when an uplink channel of the first target subframe includes a random access channel PRACH, calculate first guaranteed power of the uplink channel of the first target subframe based on the first uplink channel information and the second uplink channel information, where the first guaranteed power is power configured, by using higher layer signaling, for the UE in the base station or the cell group in which the first target subframe is located; and allocate, based on the first guaranteed power and first required power of the uplink channel of the first target subframe, the power to the UE in the base station or the cell group in which the first target subframe is located.

Optionally, the first transmitter 102 is further configured to calculate the first guaranteed power of the uplink channel of the first target subframe based on a reserved power factor of uplink data transmission in the base station or the cell group in which the second target subframe is located, transmit power of a data channel and a PRACH of the second target subframe, transmit power of the PRACH of the first target subframe, and maximum transmit power at a time point at which the transmission time of the first target subframe overlaps with the transmission time of the second target subframe.

Optionally, the reserved power allocated to the UE in the base station or the cell group in which the second target subframe is located is less than or equal to the first guaranteed power, and is less than or equal to a difference between maximum transmit power of the UE and the power allocated to the UE in the base station or the cell group in which the first target subframe is located.

Optionally, the first transmitter 102 is further configured to: when an uplink channel of the second target subframe includes a random access channel PRACH, calculate, by the UE, second guaranteed power of the uplink channel of the second target subframe based on the first uplink channel information and the second uplink channel information, where the second guaranteed power is power configured, by using higher layer signaling, for the UE in the base station or the cell group in which the second target subframe is located; and allocate, based on the second guaranteed power and second required power of the uplink channel of the second target subframe, the power to the UE in the base station or the cell group in which the second target subframe is located.

Optionally, the first transmitter 102 is further configured to calculate the guaranteed power of the uplink channel of the second target subframe based on a reserved power factor of uplink data transmission in the base station or the cell group in which the first target subframe is located, transmit power of a data channel and a PRACH of the first target subframe, transmit power of the PRACH of the second target subframe, and maximum transmit power at a time point at which the transmission time of the first target subframe overlaps with the transmission time of the second target subframe.

Optionally, the reserved power allocated to the UE in the base station or the cell group in which the first target subframe is located is less than or equal to the second guaranteed power, and is less than or equal to a difference between maximum transmit power of the UE and the power allocated to the UE in the base station or the cell group in which the second target subframe is located.

In this embodiment of this disclosure, it is determined, based on the first start time point of the first control subframe and the second start time point of the second control subframe, whether the priority of the first target subframe is higher than the priority of the second target subframe. Because a start time point of a control subframe of a target subframe that has a lower frequency may be earlier than a start time point of a control subframe of a target subframe that has a higher frequency, it can be determined that a priority of the target subframe that has a lower frequency is higher than a priority of the target subframe that has a higher frequency, and power is preferentially allocated to the UE in a base station or a cell group in which the target subframe that has a lower frequency is located. This avoids a problem that possibly idle transmit power on a target subframe whose transmission time is earlier cannot be re-allocated to a target subframe whose transmission time is later, and improves power utilization.

Referring to FIG. 2, FIG. 2 is a structural block diagram of a base station according to an embodiment of this disclosure. The base station may vary greatly due to different configurations or performance, and may include one or more second processors 201 and a second transmitter 202.

The second processor 201 is configured to obtain first uplink channel information on a first target subframe and second uplink channel information on a second target subframe. A transmission time of the second target subframe overlaps with a transmission time of the first target subframe. The second target subframe and the first target subframe have different subframe lengths. The second target subframe and the first target subframe belong to different base stations or different cell groups.

The second processor 201 is further configured to determine a first time offset of a first control subframe and a second time offset of a second control subframe based on the first uplink channel information and the second uplink channel information. The first control subframe is used to transmit control information of the first target subframe. The second control subframe is used to transmit control information of the second target subframe.

The second transmitter 202 is configured to send the first time offset and the second time offset to user equipment UE. The UE determines a first start time point of the first control subframe and a second start time point of the second control subframe based on the first time offset and the second time offset, allocates, based on the first start time point and the second start time point, power to the UE in a base station or a cell group in which the first target subframe is located, and allocates power to the UE in a base station or a cell group in which the second target subframe is located.

Optionally, in addition to the second processor 201 and the second transmitter 202, the base station may further include other components. For example, the base station may further include a second memory 203, and one or more second storage media 206 (for example, one or more mass storage devices) that store a second application program 204 or second data 205. The second memory 203 and the second storage medium 206 may be transient storages or persistent storages. A program stored in the second storage medium 206 may include one or more modules (not shown in the figure), and each module may include a series of instruction operations in a power allocation apparatus. Further, the second processor 201 may be configured to communicate with the second storage medium 206, and perform, on the UE, a series of instruction operations in the second storage medium 206.

The UE may further include one or more second power supplies 207, one or more second wired or wireless network interfaces 208, one or more second input/output interfaces 209, one or more second keyboards 210, and/or one or more second operating systems 211, such as Windows Server™, Mac OS X™, Unix™, Linux™, and FreeBSD™.

In this disclosure, the second processor 201 and the second transmitter 202 that are included in the UE may further have the following functions:

The second processor 201 is further configured to determine, based on the first uplink channel information and the second uplink channel information, whether a priority of the first target subframe is higher than a priority of the second target subframe; and the second processor 201 is further configured to: if the priority of the first target subframe is higher than the priority of the second target subframe, determine the first time offset of the first control subframe and the second time offset of the second control subframe, where the first time offset and the second time offset meet a first preset condition, and the first preset condition is that the first start time point of the first control subframe is earlier than the second start time point of the second control subframe, or a time difference between the first start time point of the first control subframe and the second start time point of the second control subframe is greater than a time difference threshold; or the second processor 201 is further configured to: if the priority of the first target subframe is lower than the priority of the second target subframe, determine the first time offset of the first control subframe and the second time offset of the second control subframe, where the first time offset and the second time offset meet a second preset condition, and the second preset condition is that the second start time point of the second control subframe is earlier than the first start time point of the first control subframe, or a time difference between the first start time point of the first control subframe and the second start time point of the second control subframe is not greater than a time difference threshold.

Further, the first processor 101 or the second processor 201 in the foregoing embodiments may be a central processing unit (CPU), a general purpose processor, a digital signal processor (DSP), an application-specific integrated circuit (ASIC), a field programmable gate array (FPGA) or another programmable logic device, a transistor logic device, a hardware device, or any combination thereof. The first processor 101 or the second processor 201 may implement or execute the logical block diagrams, modules, and circuits of the examples described in combination with the content disclosed in this disclosure. The first processor 101 or the second processor 201 may also be a combination that implements a computing function. For example, the first processor 101 or the second processor 201 includes a combination of one or more microprocessors, or a combination of a DSP and a microprocessor.

Steps of methods or algorithms described in combination with the content of this disclosure may be implemented by hardware, or may be implemented by the first processor 101 or the second processor 201 executing a software instruction. The software instruction may include a corresponding software module. The software module may be stored in a RAM, a flash memory, a ROM, an EPROM, an EEPROM, a register, a hard disk, a removable hard disk, a CD-ROM, or any other form of computer storage medium that is well known in the art. An example computer storage medium is coupled to the first processor 101 or the second processor 201, so that the first processor 101 or the second processor 201 can read information from the computer storage medium, and can write information into the computer storage medium. Certainly, a computer storage medium may alternatively be a part of the first processor 101 or the second processor 201. The first processor 101 or the second processor 201, and the computer storage medium may be located in an ASIC. In addition, the ASIC may be located in a terminal. Certainly, the first processor 101 or the second processor 201, and the computer storage medium may alternatively exist in a terminal as discrete components.

In this embodiment of this disclosure, the base station configures the first time offset and the second time offset for the UE, and the UE determines the first start time point of the first control subframe and the second start time point of the second control subframe based on the first time offset and the second time offset, so that a power allocation priority of the UE can be flexibly configured in different scenarios, and power utilization is maximally improved.

An embodiment of this disclosure provides a power allocation method. The method is applied to UE. Referring to FIG. 3-1, the method includes the following steps.

Step 301: The UE determines a first start time point of a first control subframe and a second start time point of a second control subframe.

In a current communications system, the UE simultaneously accesses different base stations or different cell groups. Before the UE transmits data to a base station, the UE obtains transmission subframes, which are referred to as a first target subframe and a second target subframe, corresponding to different base stations; or the UE obtains transmission subframes, which are referred to as a first target subframe and a second target subframe, corresponding to different cell groups.

A transmission time of the second target subframe overlaps with a transmission time of the first target subframe. The second target subframe and the first target subframe have different subframe lengths. The second target subframe and the first target subframe belong to different base stations or different cell groups.

Because the first target subframe and the second target subframe each have a specific subframe length, the transmission time of the first target subframe and the transmission time of the second target subframe each are a continuous time range. For ease of description, a transmission time range of the first target subframe is referred to as a first transmission time range, and a transmission time range of the second target subframe is referred to as a second transmission time range. The first transmission time range overlaps with the second transmission time range. In other words, the transmission time of the second target subframe overlaps with the transmission time of the first target subframe.

The first control subframe is used to transmit control information of the first target subframe. The second control subframe is used to transmit control information of the second target subframe.

The step of determining, by the UE, a first start time point of a first control subframe and a second start time point of a second control subframe may be:

obtaining, by the UE, a third start time point of the first target subframe, a fourth start time point of the second target subframe, a first subframe length of the first target subframe, and a second subframe length of the second target subframe, determining the first start time point of the first control subframe based on the third start time point and the first subframe length, and determining the second start time point of the second control subframe based on the fourth start time point and the second subframe length.

A start time point of a control subframe is usually earlier than a start time point of a target subframe by a preset quantity of subframe lengths, and the preset quantity may be 4 or the like. Therefore, the step of determining, by the UE, the first start time point of the first control subframe based on the third start time point and the first subframe length may be:

determining, by the UE based on the third start time point and the first subframe length, a first time point that is earlier than the third start time point by a preset quantity of first subframe lengths, and determining the first time point as the first start time point of the first control subframe.

Correspondingly, the step of determining, by the UE, the second start time point of the second control subframe based on the fourth start time point and the second subframe length may be:

determining, by the UE based on the fourth start time point and the second subframe length, a second time point that is earlier than the fourth start time point by a preset quantity of first subframe lengths, and determining the second time point as the second start time point of the second control subframe.

For example, the preset quantity is 4. Referring to FIG. 3-2, a sequence number of the second target subframe is n+p+4, a sequence number of the second control subframe is n+p, a sequence number of the first target subframe is N+4, and a sequence number of the first control subframe is N.

Step 302: The UE determines, based on the first start time point and the second start time point, whether a priority of a first target subframe is higher than a priority of a second target subframe, and determines first uplink channel information on the first target subframe and second uplink channel information on the second target subframe.

In this step, the UE may directly determine, depending on which of the first start time point and the second start time point is earlier, whether the priority of the first target subframe is higher than the priority of the second target subframe. This is the following first implementation. In this step, to adapt to different requirements of different scenarios, a time difference threshold may be set. The UE determines, based on a time difference between the first start time point and the second start time point and the time difference threshold, whether the priority of the first target subframe is higher than the priority of the second target subframe. This is the following second implementation.

In the first implementation, this step may be:

if the first start time point is earlier than the second start time point, determining, by the UE, that the priority of the first target subframe is higher than the priority of the second target subframe; or if the second start time point is earlier than the first start time point, determining, by the UE, that the priority of the first target subframe is lower than the priority of the second target subframe.

In the second implementation, this step may be:

calculating, by the UE, the time difference between the first start time point and the second start time point, and determining, based on the time difference and the time difference threshold, whether the priority of the first target subframe is higher than the priority of the second target subframe; and if the time difference is greater than the time difference threshold, determining, by the UE, that the priority of the first target subframe is higher than the priority of the second target subframe; or if the time difference is not greater than the time difference threshold, determining, by the UE, that the priority of the first target subframe is lower than the priority of the second target subframe.

The time difference threshold may be set and changed depending on a requirement. In this embodiment of this disclosure, the time difference threshold is not specifically limited. For example, the time difference threshold may be 3 ms.

In this step, alternatively, the UE may directly determine, based on a frequency of the first target subframe and a frequency of the second target subframe, whether the priority of the first target subframe is higher than the priority of the second target subframe. A specific process may be:

if the frequency of the first target subframe is higher than the frequency of the second target subframe, determining, by the UE, that the priority of the first target subframe is lower than the priority of the second target subframe; or if the frequency of the first target subframe is lower than the frequency of the second target subframe, determining, by the UE, that the priority of the first target subframe is higher than the priority of the second target subframe.

The UE stores the first uplink channel information and the second uplink channel information. In this step, the UE directly obtains the first uplink channel information and the second uplink channel information that have been stored. Uplink channel information includes a reserved power factor, maximum transmit power at a time point at which transmission times of target subframes overlap, transmit power of a data channel, and transmit power of a random access channel.

Step 303: If the priority of the first target subframe is higher than the priority of the second target subframe, the UE allocates, based on the first uplink channel information and the second uplink channel information, power to the UE in a base station or a cell group in which the first target subframe is located, and allocates reserved power of the UE to the UE in a base station or a cell group in which the second target subframe is located.

If the priority of the first target subframe is higher than the priority of the second target subframe, the UE preferentially allocates the power to the UE in the base station or the cell group in which the first target subframe is located, and the UE can use, in the base station or the cell group in which the second target subframe is located, only the reserved power available after the power is allocated to the base station or the cell group in which the first target subframe is located. This may be specifically implemented by using the following steps (1) to (3), including:

(1): When an uplink channel of the first target subframe includes a random access channel (Physical Random Access Channel, PRACH), the UE calculates first guaranteed power of the uplink channel of the first target subframe based on the first uplink channel information and the second uplink channel information.

The first guaranteed power is power configured, by using higher layer signaling, for the UE in the base station or the cell group in which the first target subframe is located. Uplink channel information includes a reserved power factor, maximum transmit power at a time point at which transmission times of target subframes overlap, transmit power of a data channel, and transmit power of a random access channel.

Step (1) may be specifically implemented by using the following step:

The UE calculates the first guaranteed power of the uplink channel of the first target subframe based on a reserved power factor of uplink data transmission in the base station or the cell group in which the second target subframe is located, transmit power of a data channel and a PRACH of the second target subframe, transmit power of the PRACH of the first target subframe, and maximum transmit power at a time point at which the transmission time of the first target subframe overlaps with the transmission time of the second target subframe, and by using the following formula (1):

$$P_b(i1) = \hat{P_{CMAX}}(i1, i2) - \hat{P}_{PRACH\_CG2}(i1) - \max\left\{\begin{array}{l}\hat{P}_{CMAX}(i1, i2) \cdot \frac{\gamma_{CG2}}{100} \\ \hat{P}^1_{CG1}(i2) + \hat{P}_{PRACH\_CG1}(i2)\end{array}\right\} \quad (1)$$

where $P_b(i1)$ is the first guaranteed power of the uplink channel of the first target subframe, i1 is the first target subframe, i2 is the second target subframe, $\gamma_{GG2}$ is a value of the reserved power factor of the uplink data transmission in the base station or the cell group in which the second target subframe is located, $\hat{P}_{CMAX}(i1,i2)$ is the maximum transmit power at the time point at which the transmission time of the first target subframe overlaps with the transmission time of the second target subframe, $\hat{P}^1_{CG1}(i2) + \hat{P}_{PRACH\_CG1}(i2)$ transmit power of the data channel and the random access channel of the second target subframe, and $\hat{P}_{PRACH\_CG2}(i1)$ is the transmit power of the random access memory of the first target subframe.

(2): Allocate, based on the first guaranteed power of the uplink channel of the first target subframe and first required power of the uplink channel of the first target subframe, the power to the UE in the base station or the cell group in which the first target subframe is located.

Smallest power is selected from the first guaranteed power of the uplink channel of the first target subframe and the first required power of the uplink channel of the first target subframe, and the smallest power is allocated to the UE in the base station or the cell group in which the first target subframe is located.

Correspondingly, the power allocated to the UE in the base station or the cell group in which the first target subframe is located may be expressed by using the following formula (2):

$$\hat{P}^1_{CG2}(i1) = \min\left\{\begin{array}{l}P_{q1}(i1) \\ \hat{P_{CMAX}}(i1, i2) - \hat{P}_{PRACH\_CG2}(i1) - \max\left\{\begin{array}{l}\hat{P}_{CMAX}(i1, i2) \cdot \frac{\gamma_{CG2}}{100} \\ \hat{P}^1_{CG1}(i2) + \hat{P}_{PRACH\_CG1}(i2)\end{array}\right\}\end{array}\right. \quad (2)$$

$P_{q1}(i1)$ where is the first required power of the uplink channel of the first target subframe.

(3): Allocate the reserved power of the UE to the UE in the base station or the cell group in which the second target subframe is located.

The UE obtains the reserved power available after the power is allocated to the UE in the base station or the cell group in which the first target subframe is located, and allocates the reserved power to the UE in the base station or the cell group in which the second target subframe is located.

The reserved power of the UE is allocated to the base station or the cell group in which the second target subframe is located. The reserved power is less than or equal to the first guaranteed power, and is less than or equal to a difference between maximum transmit power of the UE and the power allocated to the UE in the base station or the cell group in which the first target subframe is located.

Step 304: If the priority of the first target subframe is lower than the priority of the second target subframe, the UE allocates, based on the first uplink channel information and the second uplink channel information, power to the UE in a base station or a cell group in which the second target subframe is located, and allocates reserved power of the UE to the UE in a base station or a cell group in which the first target subframe is located.

If the priority of the first target subframe is lower than the priority of the second target subframe, the UE preferentially allocates the power to the UE in the base station or the cell group in which the second target subframe is located, and the UE can use, in the base station or the cell group in which the first target subframe is located, only the reserved power available after the power is allocated to the base station or the cell group in which the second target subframe is located. This may be specifically implemented by using the following steps (1) to (3), including:

(1): When an uplink channel of the second target subframe includes a random access channel PRACH, the UE calculates second guaranteed power of the uplink channel of the second target subframe based on the first uplink channel information and the second uplink channel information.

The second guaranteed power is power configured, by using higher layer signaling, for the UE in the base station or the cell group in which the second target subframe is located. Uplink channel information includes a reserved power factor, maximum transmit power at a time point at which transmission times of target subframes overlap, transmit power of a data channel, and transmit power of a random access channel.

Step (1) may be specifically implemented by using the following step:

The UE calculates the second guaranteed power of the uplink channel of the second target subframe based on a reserved power factor of uplink data transmission in the base station or the cell group in which the first target subframe is located, transmit power of a data channel and a PRACH of the first target subframe, transmit power of the PRACH of the second target subframe, and maximum transmit power at a time point at which the transmission time of the first target subframe overlaps with the transmission time of the second target subframe, and by using the following formula (3):

$$P_b(i2)\hat{P}_{CMAX}(i1, i2) - \hat{P}_{PRACH\_CG2}(i2) - \max\begin{cases} \hat{P}_{CMAX}(i1, i2) \cdot \frac{\gamma_{CG1}}{100} \\ \hat{P}^1_{CG1}(i1) + \hat{P}_{PRACH\_CG1}(i1) \end{cases} \quad (3)$$

where $P_b$ (i2) is the second guaranteed power of the uplink channel of the second target subframe, i1 is the first target subframe, i2 is the second target subframe, $\gamma_{GG1}$ is a value of the reserved power factor of the uplink data transmission in the base station or the cell group in which the first target subframe is located, $\hat{P}_{CMAX}(i1,i2)$ is the maximum transmit power at the time point at which the transmission time of the first target subframe overlaps with the transmission time of the second target subframe, $\hat{P}_{CG1}^1(i1)+\hat{P}_{PRACH\_CG1}(i1)$ is the transmit power of the data channel and the random access channel of the first target subframe, and $\hat{P}_{PRACH\_CG2}$ (i2) is the transmit power of the random access memory of the second target subframe.

(2): Allocate, based on the second guaranteed power of the uplink channel of the second target subframe and second required power of the uplink channel of the second target subframe, the power to the UE in the base station or the cell group in which the second target subframe is located.

Smallest power is selected from the second guaranteed power of the uplink channel of the second target subframe and the second required power of the uplink channel of the second target subframe, and the smallest power is allocated to the UE in the base station or the cell group in which the second target subframe is located.

Correspondingly, the power allocated to the UE in the base station or the cell group in which the second target subframe is located may be expressed by using the following formula (4):

$$\hat{P}^1_{CG2}(i1) = \min \begin{cases} P_{q1}(i2) \\ P_{C\hat{M}AX}(i1, i2) - \hat{P}_{PRACH\_CG2}(i2) - \max\begin{cases} \hat{P}_{CMAX}(i1, i2) \cdot \frac{\gamma_{CG1}}{100} \\ \hat{P}^1_{CG1}(i1) + \hat{P}_{PRACH\_CG1}(i1) \end{cases} \end{cases} \quad (4)$$

where $P_{q1}$ (i2) is the second required power of the uplink channel of the second target subframe.

(3): Allocate the reserved power of the UE to the UE in the base station or the cell group in which the first target subframe is located.

The UE obtains the reserved power available after the power is allocated to the UE in the base station or the cell group in which the second target subframe is located, and allocates the reserved power to the UE in the base station or the cell group in which the first target subframe is located.

The reserved power of the UE is allocated to the base station or the cell group in which the first target subframe is located. The reserved power is less than or equal to the second guaranteed power, and is less than or equal to a difference between maximum transmit power of the UE and the power allocated to the UE in the base station or the cell group in which the second target subframe is located.

In this embodiment of this disclosure, it is determined, based on the first start time point of the first control subframe and the second start time point of the second control subframe, whether the priority of the first target subframe is higher than the priority of the second target subframe. Because a start time point of a control subframe of a target subframe that has a lower frequency may be earlier than a start time point of a control subframe of a target subframe that has a higher frequency, it can be determined that a priority of the target subframe that has a lower frequency is higher than a priority of the target subframe that has a higher frequency, and power is preferentially allocated to the UE in a base station or a cell group in which the target subframe that has a lower frequency is located. This avoids a problem that possibly idle transmit power on a target subframe whose transmission time is earlier cannot be re-allocated to a target subframe whose transmission time is later, and improves power utilization.

An embodiment of this disclosure provides a power allocation method. To adapt to different requirements of different scenarios, a base station may configure a first time offset of a first control subframe and a second time offset of a second control subframe. UE determines a first start time point of the first control subframe and a second start time point of the second control subframe based on the first time offset and the second time offset, so as to flexibly configure a power allocation priority of the UE in different scenarios, and maximally improve power utilization.

Figures 1, 2, 3, 4:
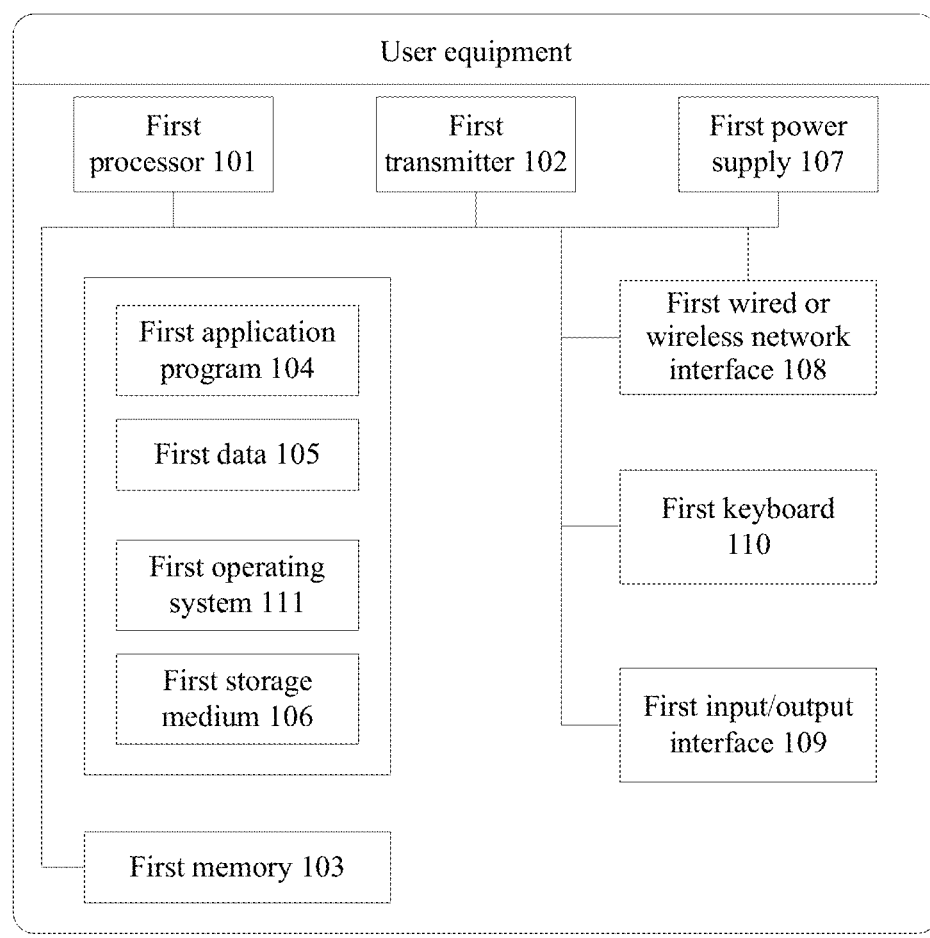
Figure 2:
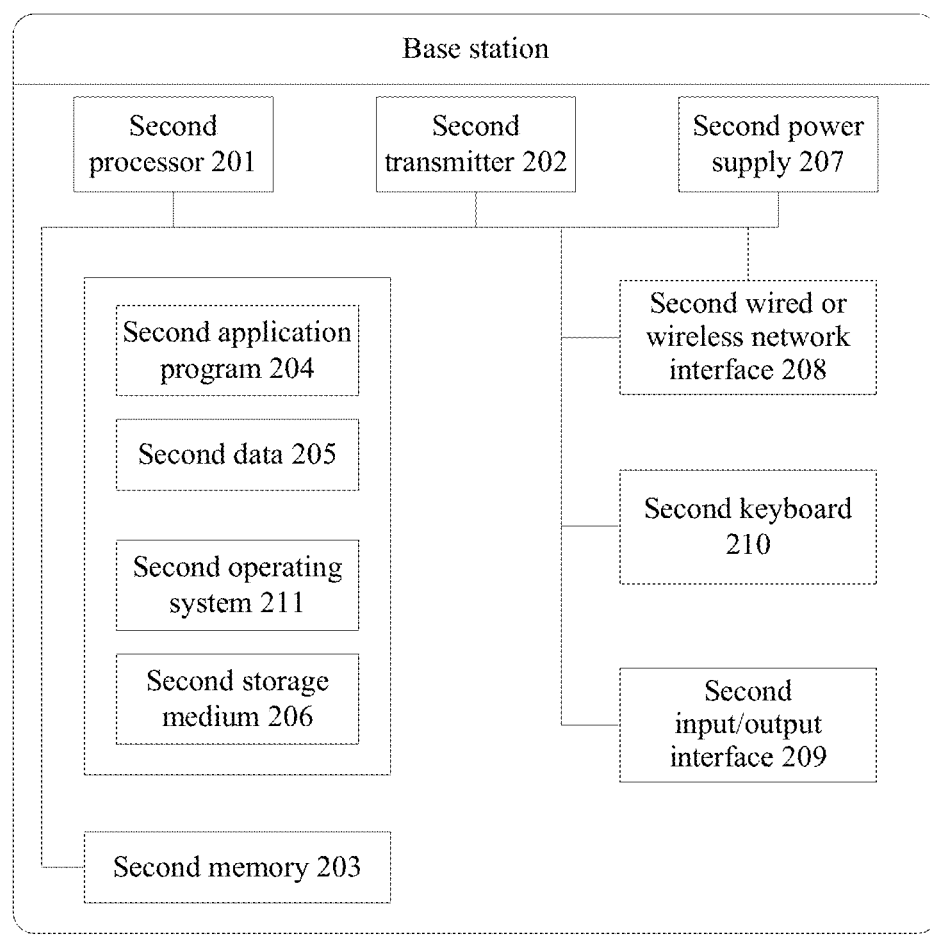
Figures 1, 3:
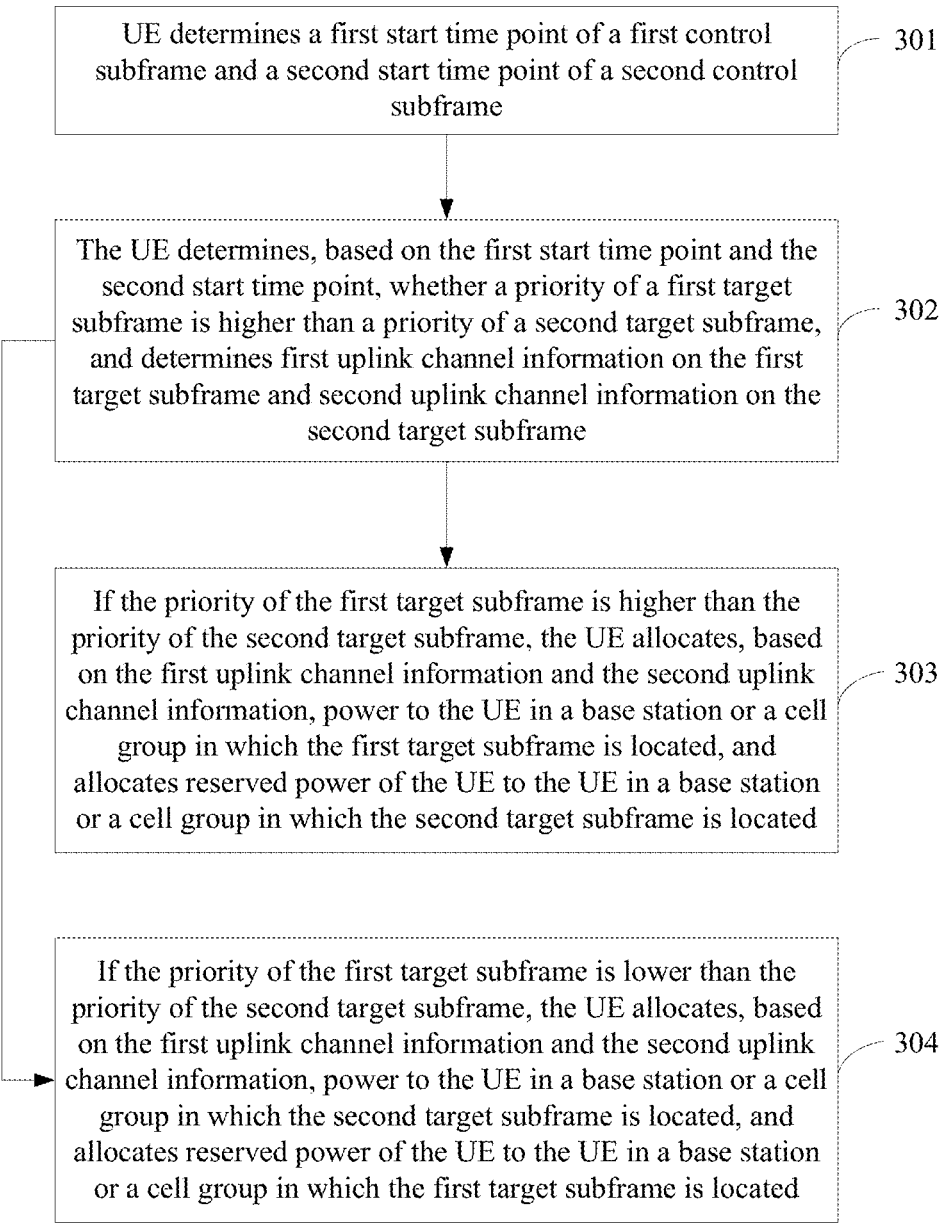
Figures 2, 3:
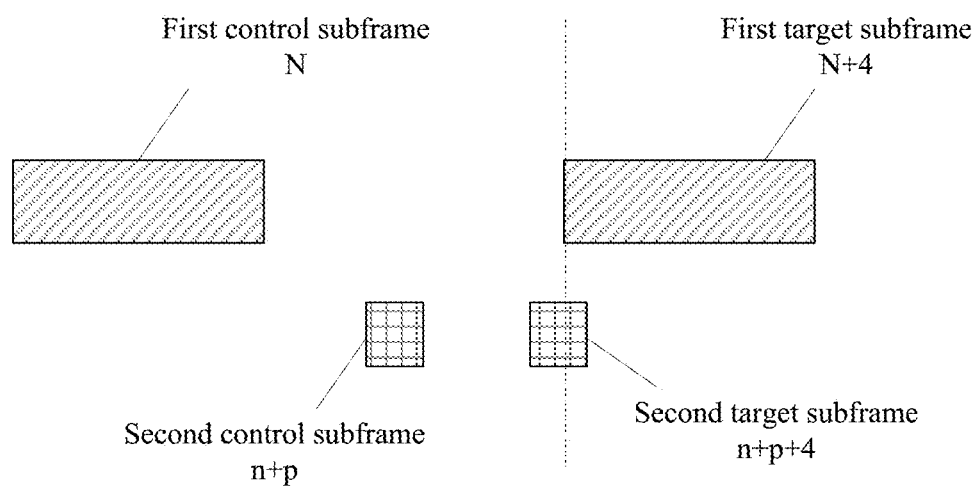
Figures 1, 4:
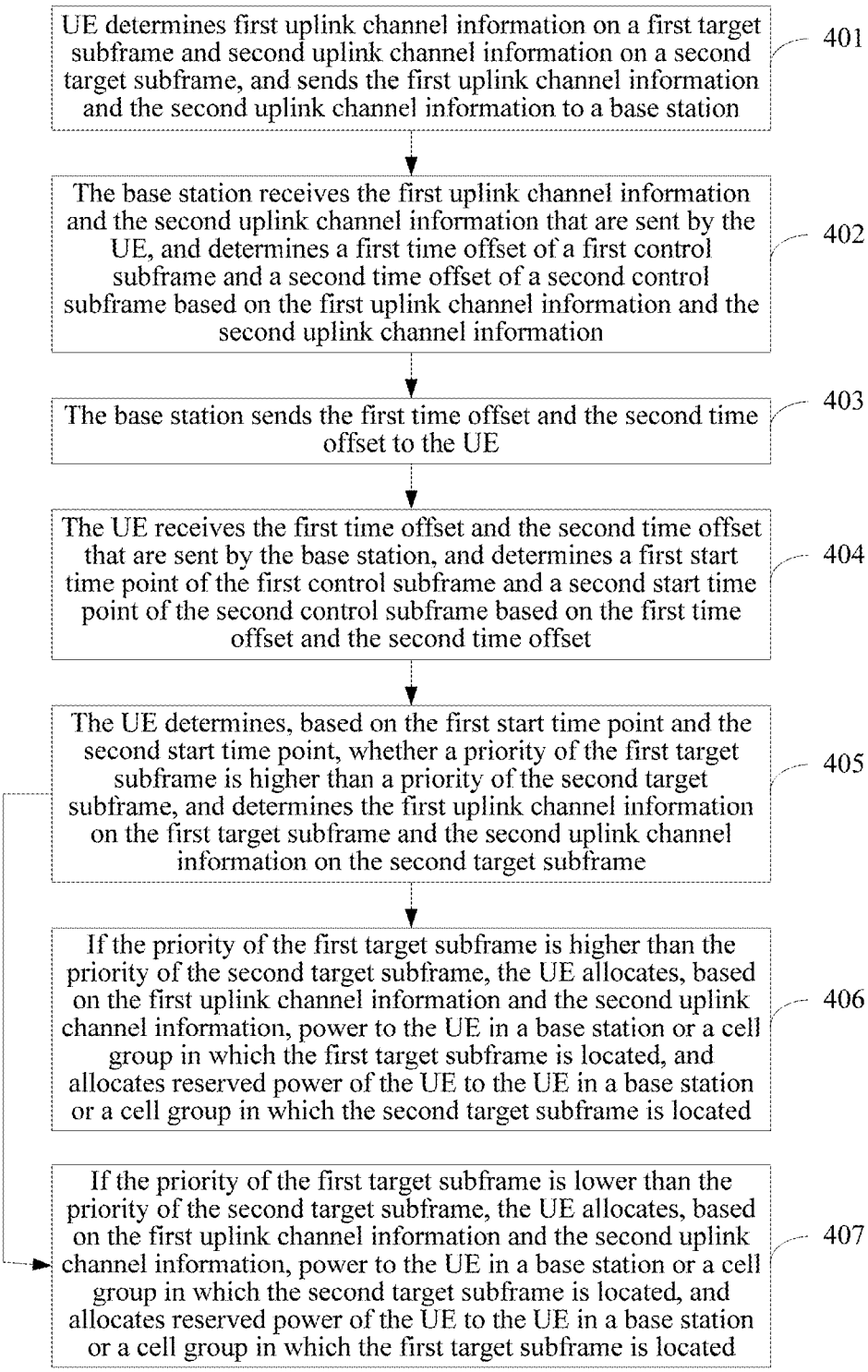
Figures 2, 4:
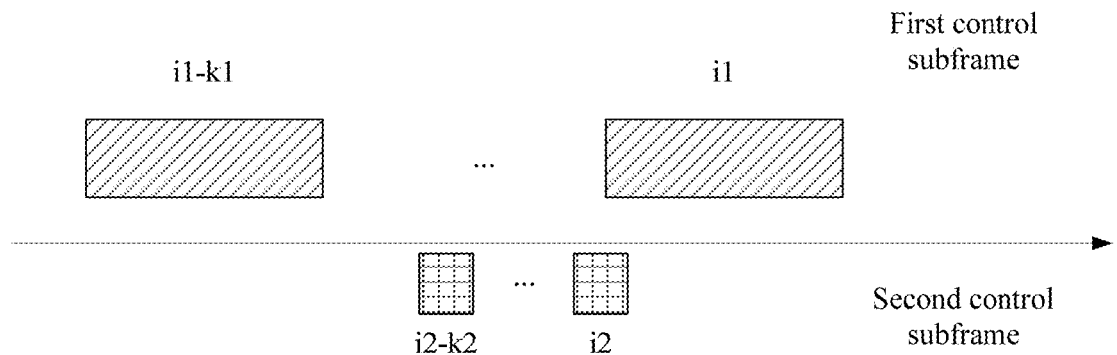

The method is applied between the UE and the base station. Referring to FIG. 4-1, the method includes the following steps.

Step 401: The UE determines first uplink channel information on a first target subframe and second uplink channel information on a second target subframe, and sends the first uplink channel information and the second uplink channel information to the base station.

A transmission time of the second target subframe overlaps with a transmission time of the first target subframe. The second target subframe and the first target subframe have different subframe lengths. The second target subframe and the first target subframe belong to different base stations or different cell groups.

In this embodiment of this disclosure, to adapt to different requirements of different scenarios, the UE sends the first uplink channel information and the second uplink channel information to the base station, and the base station determines a first time offset and a second time offset based on the first uplink channel information and the second uplink channel information.

Step 402: The base station receives the first uplink channel information and the second uplink channel information that are sent by the UE, and determines a first time offset of a first control subframe and a second time offset of a second control subframe based on the first uplink channel information and the second uplink channel information.

The first control subframe is used to transmit control information of the first target subframe. The second control subframe is used to transmit control information of the second target subframe. A time offset is used to change a start time point of a control subframe. To be specific, the first time offset is used to change a first start time point of the first control subframe, and the second time offset is used to change a second start time point of the second control subframe, so as to change a priority relationship between the first target subframe and the second target subframe. This step may be implemented by using the following steps (1) to (3), including:

(1): The base station determines, based on the first uplink channel information and the second uplink channel information, whether a priority of the first target subframe is higher than a priority of the second target subframe.

Usually, the first time offset and the second time offset that are configured by the base station makes a priority of a low-frequency subframe higher than a priority of a high-frequency subframe. For example, when a frequency of the first target subframe is lower than a frequency of the second target subframe, the first time offset and the second time offset that are configured by the base station makes the priority of the first target subframe higher than the priority of the second target subframe.

However, when the UE initiates random access on a plurality of high-frequency subframes but the access fails due to limited power, the base station may configure the first time offset and the second time offset, to make priorities of the high-frequency subframes higher than a priority of a low-frequency subframe.

Therefore, in this step, the base station determines, based on the first uplink channel information and the second uplink channel information, whether there is a target subframe, on which random access is initiated but fails due to limited power, in the first target subframe and the second target subframe. If there is such a target subframe, the base station selects the target subframe, on which the random access is initiated but fails due to the limited power, from the first target subframe and the second target subframe, and determines that a priority of the selected target subframe is higher than a target subframe that is not selected.

If there is no such a target subframe, the base station obtains a target subframe that has a lower frequency from the first target subframe and the second target subframe, and determines that a priority of the selected target subframe is higher than a target subframe that is not selected.

(2): If the priority of the first target subframe is higher than the priority of the second target subframe, the base station determines the first time offset of the first control subframe and the second time offset of the second control subframe, where the first time offset and the second time offset meet a first preset condition.

The first preset condition is that the first start time point of the first control subframe is earlier than the second start time point of the second control subframe, or a time difference between the first start time point of the first control subframe and the second start time point of the second control subframe is greater than a time difference threshold.

(3): If the priority of the first target subframe is lower than the priority of the second target subframe, the base station determines the first time offset of the first control subframe and the second time offset of the second control subframe, where the first time offset and the second time offset meet a second preset condition.

The second preset condition is that the second start time point of the second control subframe is earlier than the first start time point of the first control subframe, or a time difference between the first start time point of the first control subframe and the second start time point of the second control subframe is not greater than a time difference threshold.

Step 403: The base station sends the first time offset and the second time offset to the UE.

Step 404: The UE receives the first time offset and the second time offset that are sent by the base station, and determines a first start time point of the first control subframe and a second start time point of the second control subframe based on the first time offset and the second time offset.

The UE obtains a third start time point of the first target subframe, a fourth start time point of the second target subframe, a first subframe length of the first target subframe, and a subframe length of the second target subframe, determines the first start time point of the first control subframe based on the third start time point, the first subframe length, and the first time offset, and determines the second start time point of the second control subframe based on the fourth start time point, the second subframe length, and the second time offset.

A start time point of a control subframe is usually earlier than a start time point of a target subframe by a preset quantity of subframe lengths, and the preset quantity may be 4 or the like. Therefore, the step of determining, by the UE, the first start time point of the first control subframe based on the third start time point, the first subframe length, and the first time offset may be:

determining, by the UE based on the third start time point and the first subframe length, a first time point that is earlier than the third start time point by a preset quantity of first subframe lengths, determining, based on the first time point and the first time offset, a third time point that is earlier than the first time point by the first time offset, and determining the third time point as the first start time point of the first control subframe.

Correspondingly, the step of determining, by the UE, the second start time point of the second control subframe based on the fourth start time point, the second subframe length, and the second time offset may be:

determining, by the UE based on the fourth start time point and the second subframe length, a second time point that is earlier than the fourth start time point by a preset quantity of first subframe lengths, determining, based on the second time point and the second time offset, a fourth time point that is earlier than the second time point by the second time offset, and determining the fourth time point as the second start time point of the second control subframe.

For example, referring to FIG. 4-2, the first control subframe is i1, the first time offset is k1, the first start time point of the first control subframe is i1-k1, the second control subframe is i2, the second time offset is k2, and the second start time point of the second control subframe is i2-k2.

Step 405: The UE determines, based on the first start time point and the second start time point, whether a priority of the first target subframe is higher than a priority of the second target subframe, and determines the first uplink channel information on the first target subframe and the second uplink channel information on the second target subframe.

This step may be implemented in the following first manner or second manner. In the first implementation, this step may be:

if the first start time point is earlier than the second start time point, determining, by the UE, that the priority of the first target subframe is higher than the priority of the second target subframe; or if the second start time point is earlier than the first start time point, determining, by the UE, that the priority of the first target subframe is lower than the priority of the second target subframe.

In the second implementation, this step may be:

calculating, by the UE, the time difference between the first start time point and the second start time point, and determining, based on the time difference and the time difference threshold, whether the priority of the first target subframe is higher than the priority of the second target subframe; and if the time difference is greater than the time difference threshold, determining, by the UE, that the priority of the first target subframe is higher than the priority of the second target subframe; or if the time difference is not greater than the time difference threshold, determining, by the UE, that the priority of the first target subframe is lower than the priority of the second target subframe.

The time difference threshold may be set and changed depending on a requirement. In this embodiment of this disclosure, the time difference threshold is not specifically limited. For example, the time difference threshold may be 3 ms.

Step 406: If the priority of the first target subframe is higher than the priority of the second target subframe, the UE allocates, based on the first uplink channel information and the second uplink channel information, power to the UE in a base station or a cell group in which the first target subframe is located, and allocates reserved power of the UE to the UE in a base station or a cell group in which the second target subframe is located.

This step is the same as step 303 in the foregoing embodiment. Details are not described herein again.

Step 407: If the priority of the first target subframe is lower than the priority of the second target subframe, the UE allocates, based on the first uplink channel information and the second uplink channel information, power to the UE in a base station or a cell group in which the second target subframe is located, and allocates reserved power of the UE to the UE in a base station or a cell group in which the first target subframe is located.

This step is the same as step 304 in the foregoing embodiment. Details are not described herein again.

In this embodiment of this disclosure, the base station configures the first time offset and the second time offset for the UE, and the UE determines the first start time point of the first control subframe and the second start time point of the second control subframe based on the first time offset and the second time offset, so that a power allocation priority of the UE can be flexibly configured in different scenarios, and power utilization is maximally improved.

Figure 5:
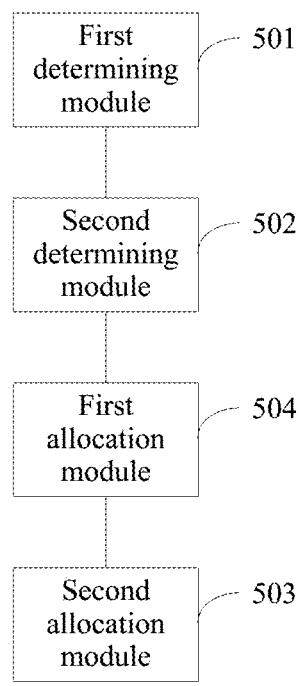
FIG. 5 is a schematic structural diagram of a power allocation apparatus according to an embodiment of this disclosure.

An embodiment of this disclosure provides a power allocation apparatus. The apparatus is applied to UE, and is configured to perform the power allocation method in the foregoing embodiment. Referring to FIG. 5, the apparatus includes a first determining module 501, a second determining module 502, a first allocation module 503, and a second allocation module 504.

The first determining module 501 is configured to determine a first start time point of a first control subframe and a second start time point of a second control subframe. The first control subframe is used to transmit control information of a first target subframe. The second control subframe is used to transmit control information of a second target subframe. A transmission time of the second target subframe overlaps with a transmission time of the first target subframe. The second target subframe and the first target subframe have different subframe lengths. The second target subframe and the first target subframe belong to different base stations or different cell groups.

The second determining module 502 is configured to determine, based on the first start time point and the second start time point, whether a priority of the first target subframe is higher than a priority of the second target subframe, and determine first uplink channel information on the first target subframe and second uplink channel information on the second target subframe.

The first allocation module 503 is configured to: if the priority of the first target subframe is higher than the priority of the second target subframe, allocate, based on the first uplink channel information and the second uplink channel information, power to the UE in a base station or a cell group in which the first target subframe is located, and allocate reserved power of the UE to the UE in a base station or a cell group in which the second target subframe is located.

The second allocation module 504 is configured to: if the priority of the first target subframe is lower than the priority of the second target subframe, allocate, based on the first uplink channel information and the second uplink channel information, power to the UE in a base station or a cell group in which the second target subframe is located, and allocate reserved power of the UE to the UE in a base station or a cell group in which the first target subframe is located.

Optionally, the second determining module 502 is further configured to: if the first start time point is earlier than the second start time point, determine that the priority of the first target subframe is higher than the priority of the second target subframe; or the second determining module 502 is further configured to: if the second start time point is earlier than the first start time point, determine that the priority of the first target subframe is lower than the priority of the second target subframe.

Optionally, the second determining module 502 is further configured to: calculate a time difference between the first start time point and the second start time point, and determine, based on the time difference and a time difference threshold, whether the priority of the first target subframe is higher than the priority of the second target subframe.

Optionally, the second determining module 502 is further configured to: if the time difference is greater than the time difference threshold, determine that the priority of the first target subframe is higher than the priority of the second target subframe; or the second determining module 502 is further configured to: if the time difference is not greater than the time difference threshold, determine that the priority of the first target subframe is lower than the priority of the second target subframe.

Optionally, the first determining module 501 is further configured to: obtain a first time offset of the first control subframe and a second time offset of the second control subframe, and determine the first start time point of the first control subframe and the second start time point of the second control subframe based on the first time offset and the second time offset.

Optionally, the first allocation module 503 is further configured to: when an uplink channel of the first target subframe includes a random access channel PRACH, calculate first guaranteed power of the uplink channel of the first target subframe based on the first uplink channel information and the second uplink channel information, where the first guaranteed power is power configured, by using higher layer signaling, for the UE in the base station or the cell group in which the first target subframe is located; and allocate, based on the first guaranteed power and first required power of the uplink channel of the first target subframe, the power to the UE in the base station or the cell group in which the first target subframe is located.

Optionally, the first allocation module 503 is further configured to calculate the first guaranteed power of the uplink channel of the first target subframe based on a reserved power factor of uplink data transmission in the base station or the cell group in which the second target subframe is located, transmit power of a data channel and a PRACH of the second target subframe, transmit power of the PRACH of the first target subframe, and maximum transmit power at a time point at which the transmission time of the first target subframe overlaps with the transmission time of the second target subframe.

Optionally, the reserved power allocated to the UE in the base station or the cell group in which the second target subframe is located is less than or equal to the first guaranteed power, and is less than or equal to a difference between maximum transmit power of the UE and the power allocated to the UE in the base station or the cell group in which the first target subframe is located.

Optionally, the second allocation module 504 is further configured to: when an uplink channel of the second target subframe includes a random access channel PRACH, calculate second guaranteed power of the uplink channel of the second target subframe based on the first uplink channel information and the second uplink channel information, where the second guaranteed power is power configured, by using higher layer signaling, for the UE in the base station or the cell group in which the second target subframe is located; and allocate, based on the second guaranteed power and second required power of the uplink channel of the second target subframe, the power to the UE in the base station or the cell group in which the second target subframe is located.

Optionally, the second allocation module 504 is further configured to calculate the guaranteed power of the uplink channel of the second target subframe based on a reserved power factor of uplink data transmission in the base station or the cell group in which the first target subframe is located, transmit power of a data channel and a PRACH of the first target subframe, transmit power of the PRACH of the second target subframe, and maximum transmit power at a time point at which the transmission time of the first target subframe overlaps with the transmission time of the second target subframe.

Optionally, the reserved power allocated to the UE in the base station or the cell group in which the first target subframe is located is less than or equal to the second guaranteed power, and is less than or equal to a difference between maximum transmit power of the UE and the power allocated to the UE in the base station or the cell group in which the second target subframe is located.

In this embodiment of this disclosure, it is determined, based on the first start time point of the first control subframe and the second start time point of the second control subframe, whether the priority of the first target subframe is higher than the priority of the second target subframe. Because a start time point of a control subframe of a target subframe that has a lower frequency may be earlier than a start time point of a control subframe of a target subframe that has a higher frequency, it can be determined that a priority of the target subframe that has a lower frequency is higher than a priority of the target subframe that has a higher frequency, and power is preferentially allocated to the UE in a base station or a cell group in which the target subframe that has a lower frequency is located. This avoids a problem that possibly idle transmit power on a target subframe whose transmission time is earlier cannot be re-allocated to a target subframe whose transmission time is later, and improves power utilization.

Figure 6:
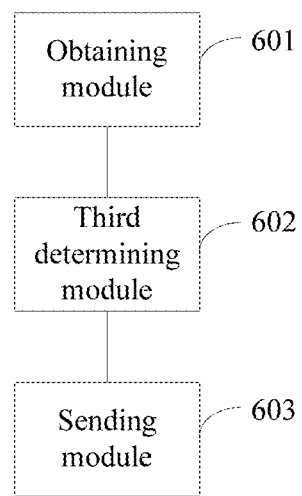
FIG. 6 is a schematic structural diagram of a power allocation apparatus according to an embodiment of this disclosure.

An embodiment of this disclosure provides a power allocation apparatus. The apparatus is applied to a base station, and is configured to perform the power allocation method in the foregoing embodiment. Referring to FIG. 6, the apparatus includes an obtaining module 601, a third determining module 602, and a sending module 603.

The obtaining module 601 is configured to obtain first uplink channel information on a first target subframe and second uplink channel information on a second target subframe. A transmission time of the second target subframe overlaps with a transmission time of the first target subframe. The second target subframe and the first target subframe have different subframe lengths. The second target subframe and the first target subframe belong to different base stations or different cell groups.

The third determining module 602 is configured to determine a first time offset of a first control subframe and a second time offset of a second control subframe based on the first uplink channel information and the second uplink channel information. The first control subframe is used to transmit control information of the first target subframe. The second control subframe is used to transmit control information of the second target subframe.

The sending module 603 is configured to send the first time offset and the second time offset to user equipment UE. The UE determines a first start time point of the first control subframe and a second start time point of the second control subframe based on the first time offset and the second time offset, allocates, based on the first start time point and the second start time point, power to the UE in a base station or a cell group in which the first target subframe is located, and allocates power to the UE in a base station or a cell group in which the second target subframe is located.

Optionally, the third determining module 602 is further configured to determine, based on the first uplink channel information and the second uplink channel information, whether a priority of the first target subframe is higher than a priority of the second target subframe.

The third determining module 602 is further configured to: if the priority of the first target subframe is higher than the priority of the second target subframe, determine the first time offset of the first control subframe and the second time offset of the second control subframe, where the first time offset and the second time offset meet a first preset condition, and the first preset condition is that the first start time point of the first control subframe is earlier than the second start time point of the second control subframe, or a time difference between the first start time point of the first control subframe and the second start time point of the second control subframe is greater than a time difference threshold; or the third determining module 602 is further configured to: if the priority of the first target subframe is lower than the priority of the second target subframe, determine the first time offset of the first control subframe and the second time offset of the second control subframe, where the first time offset and the second time offset meet a second preset condition, and the second preset condition is that the second start time point of the second control subframe is earlier than the first start time point of the first control subframe, or a time difference between the first start time point of the first control subframe and the second start time point of the second control subframe is not greater than a time difference threshold.

In this embodiment of this disclosure, the base station configures the first time offset and the second time offset for the UE, and the UE determines the first start time point of the first control subframe and the second start time point of the second control subframe based on the first time offset and the second time offset, so that a power allocation priority of the UE can be flexibly configured in different scenarios, and power utilization is maximally improved.

It should be noted that, when the power allocation apparatus provided in the foregoing embodiments performs power allocation, division of the foregoing function modules is merely used as an example for description. In actual application, the foregoing functions may be allocated to different function modules and implemented according to a requirement, that is, an inner structure of the apparatus is divided into different function modules to implement all or some of the functions described above. In addition, the power allocation apparatus provided in the foregoing embodiments and the power allocation method embodiments belong to a same idea. For details about a specific implementation process of the power allocation apparatus, refer to the method embodiments. Details are not described herein again.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely example embodiments of this disclosure, but are not intended to limit this disclosure. Any modification, equivalent replacement, or improvement made without departing from the spirit and principle of this disclosure shall fall within the protection scope of this disclosure.

What is claimed is:

1. A method of power allocation, comprising:
   determining, by user equipment UE, a first start time point of a first control subframe and a second start time point of a second control subframe, wherein the first control subframe is used to transmit control information of a first target subframe, the second control subframe is used to transmit control information of a second target subframe, a transmission time of the second target subframe overlaps with a transmission time of the first target subframe, the second target subframe and the first target subframe have different subframe lengths, and the second target subframe and the first target subframe belong to different base stations or different cell groups;
   determining, by the UE based on the first start time point and the second start time point, whether a priority of the first target subframe is higher than a priority of the second target subframe, and determining first uplink channel information on the first target subframe and second uplink channel information on the second target subframe; and
   when the priority of the first target subframe is higher than the priority of the second target subframe, allocating, by the UE based on the first uplink channel information and the second uplink channel information, power to the UE in a base station or a cell group in which the first target subframe is located, and allocating reserved power of the UE to the UE in a base station or a cell group in which the second target subframe is located; or
   when the priority of the first target subframe is lower than the priority of the second target subframe, allocating, by the UE based on the first uplink channel information and the second uplink channel information, power to the UE in a base station or a cell group in which the second target subframe is located, and allocating reserved power of the UE to the UE in a base station or a cell group in which the first target subframe is located.

2. The method according to claim 1, wherein the determining, by the UE based on the first start time point and the second start time point, whether a priority of the first target subframe is higher than a priority of the second target subframe comprises:
   when the first start time point is earlier than the second start time point, determining, by the UE, that the priority of the first target subframe is higher than the priority of the second target subframe; or
   when the second start time point is earlier than the first start time point, determining, by the UE, that the priority of the first target subframe is lower than the priority of the second target subframe.

3. The method according to claim 1, wherein the determining, by the UE based on the first start time point and the second start time point, whether a priority of the first target subframe is higher than a priority of the second target subframe comprises:
   calculating, by the UE, a time difference between the first start time point and the second start time point; and determining, by the UE based on the time difference and a time difference threshold, whether the priority of the first target subframe is higher than the priority of the second target subframe.

4. The method according to claim 3, wherein the determining, by the UE based on the time difference and a time difference threshold, whether the priority of the first target subframe is higher than the priority of the second target subframe comprises:

when the time difference is greater than the time difference threshold, determining, by the UE, that the priority of the first target subframe is higher than the priority of the second target subframe; or when the time difference is not greater than the time difference threshold, determining, by the UE, that the priority of the first target subframe is lower than the priority of the second target subframe.

5. The method according to claim 1, wherein the determining, by UE, a first start time point of a first control subframe and a second start time point of a second control subframe comprises:

obtaining, by the UE, a first time offset of the first control subframe and a second time offset of the second control subframe; and determining, by the UE, the first start time point of the first control subframe and the second start time point of the second control subframe based on the first time offset and the second time offset.

6. The method according to claim 1, wherein the allocating, by the UE based on the first uplink channel information and the second uplink channel information, power to the UE in a base station or a cell group in which the first target subframe is located comprises:

when an uplink channel of the first target subframe comprises a random access channel PRACH, calculating, by the UE, first guaranteed power of the uplink channel of the first target subframe based on the first uplink channel information and the second uplink channel information, wherein the first guaranteed power is power configured, by using higher layer signaling, for the UE in the base station or the cell group in which the first target subframe is located; and allocating, by the UE based on the first guaranteed power and first required power of the uplink channel of the first target subframe, the power to the UE in the base station or the cell group in which the first target subframe is located.

7. The method according to claim 6, wherein the calculating, by the UE, first guaranteed power of the uplink channel of the first target subframe based on the first uplink channel information and the second uplink channel information comprises:

calculating, by the UE, the first guaranteed power of the uplink channel of the first target subframe based on a reserved power factor of uplink data transmission in the base station or the cell group in which the second target subframe is located, transmit power of a data channel and a PRACH of the second target subframe, transmit power of the PRACH of the first target subframe, and maximum transmit power at a time point at which the transmission time of the first target subframe overlaps with the transmission time of the second target subframe.

8. The method according to claim 6, wherein the reserved power allocated to the UE in the base station or the cell group in which the second target subframe is located is less than or equal to the first guaranteed power, and is less than or equal to a difference between maximum transmit power of the UE and the power allocated to the UE in the base station or the cell group in which the first target subframe is located.

9. The method according to claim 1, wherein the allocating, by the UE based on the first uplink channel information and the second uplink channel information, power to the UE in a base station or a cell group in which the second target subframe is located comprises:

when an uplink channel of the second target subframe comprises a random access channel PRACH, calculating, by the UE, second guaranteed power of the uplink channel of the second target subframe based on the first uplink channel information and the second uplink channel information, wherein the second guaranteed power is power configured, by using higher layer signaling, for the UE in the base station or the cell group in which the second target subframe is located; and allocating, by the UE based on the second guaranteed power and second required power of the uplink channel of the second target subframe, the power to the UE in the base station or the cell group in which the second target subframe is located.

10. The method according to claim 9, wherein the calculating, by the UE, second guaranteed power of the uplink channel of the second target subframe based on the first uplink channel information and the second uplink channel information comprises:

calculating, by the UE, the guaranteed power of the uplink channel of the second target subframe based on a reserved power factor of uplink data transmission in the base station or the cell group in which the first target subframe is located, transmit power of a data channel and a PRACH of the first target subframe, transmit power of the PRACH of the second target subframe, and maximum transmit power at a time point at which the transmission time of the first target subframe overlaps with the transmission time of the second target subframe.

11. A power allocation apparatus, comprising:
at least one memory to store instructions; and
at least one processor to execute the instructions to cause the power allocation apparatus to:
determine a first start time point of a first control subframe and a second start time point of a second control subframe, wherein the first control subframe is used to transmit control information of a first target subframe, the second control subframe is used to transmit control information of a second target subframe, a transmission time of the second target subframe overlaps with a transmission time of the first target subframe, the second target subframe and the first target subframe have different subframe lengths, and the second target subframe and the first target subframe belong to different base stations or different cell groups;
determine, based on the first start time point and the second start time point, whether a priority of the first target subframe is higher than a priority of the second target subframe, and determine first uplink channel information on the first target subframe and second uplink channel information on the second target subframe;
when the priority of the first target subframe is higher than the priority of the second target subframe, allocate, based on the first uplink channel information and the second uplink channel information, power to the UE in a base station or a cell group in which the first target subframe is located, and allocate reserved power of the UE to the UE in a base station or a cell group in which the second target subframe is located; and when the priority of the first target subframe is lower than the priority of the second target subframe, allocate, based on the first uplink channel information and the second uplink channel information, power to the UE in a base station or a cell group in which the second target subframe is located, and allocate reserved power of the UE to the UE in a base station or a cell group in which the first target subframe is located.

12. The apparatus according to claim 11, wherein the at least one processor further executes the instructions to cause the power allocation apparatus to:

when the first start time point is earlier than the second start time point, determine that the priority of the first target subframe is higher than the priority of the second target subframe; or when the second start time point is earlier than the first start time point, determine that the priority of the first target subframe is lower than the priority of the second target subframe.

13. The apparatus according to claim 11, wherein the at least one processor further executes the instructions to cause the power allocation apparatus to:

calculate a time difference between the first start time point and the second start time point, and determine, based on the time difference and a time difference threshold, whether the priority of the first target subframe is higher than the priority of the second target subframe.

14. The apparatus according to claim 13, wherein the at least one processor further executes the instructions to cause the power allocation apparatus to: when the time difference is greater than the time difference threshold, determine that the priority of the first target subframe is higher than the priority of the second target subframe; or when the time difference is not greater than the time difference threshold, determine that the priority of the first target subframe is lower than the priority of the second target subframe.

15. The apparatus according to claim 11, wherein the at least one processor further executes the instructions to cause the power allocation apparatus to:

obtain a first time offset of the first control subframe and a second time offset of the second control subframe, and determine the first start time point of the first control subframe and the second start time point of the second control subframe based on the first time offset and the second time offset.

16. A non-transitory computer storage medium storing a computer program when executed by a processor implements:

determining a first start time point of a first control subframe and a second start time point of a second control subframe, wherein the first control subframe is used to transmit control information of a first target subframe, the second control subframe is used to transmit control information of a second target subframe, a transmission time of the second target subframe overlaps with a transmission time of the first target subframe, the second target subframe and the first target subframe have different subframe lengths, and the second target subframe and the first target subframe belong to different base stations or different cell groups;

determining, based on the first start time point and the second start time point, whether a priority of the first target subframe is higher than a priority of the second target subframe, and determining first uplink channel information on the first target subframe and second uplink channel information on the second target subframe; and when the priority of the first target subframe is higher than the priority of the second target subframe, allocating, based on the first uplink channel information and the second uplink channel information, power to user equipment UE in a base station or a cell group in which the first target subframe is located, and allocating reserved power of the UE to the UE in a base station or a cell group in which the second target subframe is located; or when the priority of the first target subframe is lower than the priority of the second target subframe, allocating, based on the first uplink channel information and the second uplink channel information, power to the UE in a base station or a cell group in which the second target subframe is located, and allocating reserved power of the UE to the UE in a base station or a cell group in which the first target subframe is located.

\* \* \* \* \*